(12) United States Patent  (10) Patent No.: US 8,751,421 B2
Anderson et al.  (45) Date of Patent: Jun. 10, 2014

(54) MACHINE LEARNING FOR POWER GRID

(71) Applicants: The Trustees of Columbia University in the City of New York, New York, NY (US); Consolidated Edison Company of New York, New York, NY (US)

(72) Inventors: Roger N. Anderson, New York, NY (US); Albert Boulanger, New York, NY (US); Cynthia Rudin, New York, NY (US); David Waltz, Princeton, NJ (US); Ansaf Salleb-Aouissi, Middle Village, NY (US); Maggie Chow, Hartsdale, NY (US); Haimonti Dutta, Trenton, NJ (US); Phil Gross, Brooklyn, NY (US); Huang Bert, Silver Spring, MD (US); Steve Ierome, New York, NY (US); Delfina Isaac, New York, NY (US); Arthur Kressner, Westfiled, NJ (US); Rebecca J. Passonneau, New York, NY (US); Axinia Radeva, New York, NY (US); Leon L. Wu, New York, NY (US); Peter Hofmann, Hasbrouck Heights, NJ (US); Frank Dougherty, Yorktown Heights, NY (US)

(73) Assignees: The Trustees of Columbia University in the city of New York, New York, NY (US); Consolidated Edison Company of New York, New York, NY (US)

( * ) Notice: Subject to any disclaimer, the term of this patent is extended or adjusted under 35 U.S.C. 154(b) by 0 days.

(21) Appl. No.: 13/742,124

(22) Filed: Jan. 15, 2013

(65) Prior Publication Data
US 2013/0232094 A1 Sep. 5, 2013

Related U.S. Application Data

(63) Continuation of application No. PCT/US2011/044389, filed on Jul. 18, 2011.

(60) Provisional application No. 61/364,988, filed on Jul. 16, 2010.

(51) Int. Cl.
G06F 15/18 (2006.01)

(52) U.S. Cl.
CPC ................................ *G06F 11/12* (2013.01)
USPC .......................................................... 706/12

(58) Field of Classification Search
CPC .... G06F 11/008; G06F 11/22; G06F 11/2252
USPC .......................................... 706/12, 20, 45, 62
See application file for complete search history.

(56) References Cited

U.S. PATENT DOCUMENTS

| | | |
|---|---|---|
| 5,225,712 A | 7/1993 | Erdman |
| 5,625,751 A | 4/1997 | Brandwajn et al. |
| 5,764,155 A | 6/1998 | Kertesz et al. |
| 5,862,391 A | 1/1999 | Salas et al. |
| 5,875,431 A | 2/1999 | Heckman et al. |
| 5,893,069 A | 4/1999 | White et al. |
| 5,959,547 A | 9/1999 | Tubel et al. |
| 5,963,457 A | 10/1999 | Kano et al. |
| 6,012,016 A | 1/2000 | Bilden et al. |
| 6,055,517 A | 4/2000 | Friend et al. |
| 6,125,044 A | 9/2000 | Cherniski et al. |
| 6,125,453 A | 9/2000 | Wyss |
| 6,154,731 A | 11/2000 | Monk et al. |
| 6,169,981 B1 | 1/2001 | Werbos |
| 6,219,650 B1 | 4/2001 | Friend et al. |
| 6,266,619 B1 | 7/2001 | Thomas et al. |
| 6,308,162 B1 | 10/2001 | Ouimet et al. |
| 6,311,144 B1 | 10/2001 | Abu El Ata |
| 6,321,205 B1 | 11/2001 | Eder |
| 6,434,435 B1 | 8/2002 | Tubel et al. |
| 6,519,568 B1 | 2/2003 | Harvey et al. |
| 6,581,045 B1 | 6/2003 | Watson |
| 6,629,044 B1 | 9/2003 | Papallo, Jr. et al. |
| 6,772,211 B2 | 8/2004 | Lu et al. |
| 6,807,537 B1 | 10/2004 | Thiesson et al. |
| 6,826,483 B1 | 11/2004 | Anderson et al. |
| 6,829,384 B2 | 12/2004 | Schneiderman et al. |
| 6,944,678 B2 | 9/2005 | Lu et al. |
| 6,963,793 B2 | 11/2005 | Yamada et al. |
| 7,106,045 B2 | 9/2006 | Jungwirth et al. |
| 7,127,584 B1 | 10/2006 | Thompson et al. |
| 7,130,832 B2 | 10/2006 | Bannai et al. |
| 7,132,623 B2 | 11/2006 | De Miranda et al. |

| | | |
|---|---|---|
| 7,233,843 B2 | 6/2007 | Budhraja et al. |
| 7,236,953 B1 | 6/2007 | Cooper et al. |
| 7,243,081 B2 | 7/2007 | Friend et al. |
| 7,274,975 B2 | 9/2007 | Miller |
| 7,369,950 B2 | 5/2008 | Wall et al. |
| 7,395,252 B2 | 7/2008 | Anderson et al. |
| 7,464,119 B1 | 12/2008 | Akram et al. |
| 7,519,506 B2 | 4/2009 | Trias |
| 7,555,454 B2 | 6/2009 | Cooper et al. |
| 7,590,472 B2 | 9/2009 | Hakim et al. |
| 7,653,449 B2 | 1/2010 | Hunter et al. |
| 7,873,567 B2 | 1/2011 | Eder |
| 7,925,557 B1 | 4/2011 | Ficery et al. |
| 7,945,524 B2 | 5/2011 | Anderson et al. |
| 8,036,996 B2 | 10/2011 | Long et al. |
| 8,116,915 B2 | 2/2012 | Kempton |
| 8,305,737 B2 | 11/2012 | Ewing et al. |
| 2001/0049651 A1 | 12/2001 | Selleck |
| 2002/0001307 A1 | 1/2002 | Nguyen et al. |
| 2002/0084655 A1 | 7/2002 | Lof et al. |
| 2002/0087234 A1 | 7/2002 | Lof et al. |
| 2002/0198627 A1 | 12/2002 | Nasman et al. |
| 2003/0130755 A1 | 7/2003 | Bazzocchi et al. |
| 2003/0171851 A1 | 9/2003 | Brickfield et al. |
| 2003/0188208 A1 | 10/2003 | Fung |
| 2004/0143477 A1 | 7/2004 | Wolff |
| 2004/0158417 A1 | 8/2004 | Bonet |
| 2004/0158772 A1 | 8/2004 | Pan et al. |
| 2004/0163895 A1 | 8/2004 | Kostka et al. |
| 2004/0267395 A1 | 12/2004 | Discenzo et al. |
| 2005/0033707 A1 | 2/2005 | Ehlers et al. |
| 2005/0034023 A1 | 2/2005 | Maturana et al. |
| 2005/0207081 A1 | 9/2005 | Ying |
| 2006/0106797 A1 | 5/2006 | Srinivasa et al. |
| 2006/0168398 A1 | 7/2006 | Cadaret |
| 2006/0185756 A1 | 8/2006 | Sato et al. |
| 2006/0200400 A1 | 9/2006 | Hunter et al. |
| 2006/0259199 A1 | 11/2006 | Gjerde et al. |
| 2006/0288260 A1 | 12/2006 | Xiao et al. |
| 2007/0094187 A1 | 4/2007 | Anderson et al. |
| 2007/0177508 A1 | 8/2007 | Croak et al. |
| 2007/0192078 A1 | 8/2007 | Nasle et al. |
| 2007/0198108 A1 | 8/2007 | Nair et al. |
| 2007/0228843 A1 | 10/2007 | Radley |
| 2007/0271006 A1 | 11/2007 | Golden et al. |
| 2008/0039980 A1 | 2/2008 | Pollack et al. |
| 2008/0109205 A1 | 5/2008 | Nasle |
| 2008/0126171 A1 | 5/2008 | Baldwin et al. |
| 2008/0167756 A1 | 7/2008 | Golden et al. |
| 2008/0177678 A1 | 7/2008 | Di Martini et al. |
| 2008/0183339 A1 | 7/2008 | Vaswani et al. |
| 2008/0250265 A1 | 10/2008 | Chang et al. |
| 2008/0281663 A1 | 11/2008 | Hakim et al. |
| 2008/0294387 A1 | 11/2008 | Anderson et al. |
| 2008/0313006 A1 | 12/2008 | Witter et al. |
| 2008/0319923 A1 | 12/2008 | Casey et al. |
| 2009/0031241 A1 | 1/2009 | Castelli et al. |
| 2009/0063094 A1 | 3/2009 | Havener et al. |
| 2009/0063122 A1 | 3/2009 | Nasle |
| 2009/0076749 A1 | 3/2009 | Nasle |
| 2009/0113049 A1 | 4/2009 | Nasle et al. |
| 2009/0157573 A1* | 6/2009 | Anderson et al. ............... 706/12 |
| 2009/0178089 A1 | 7/2009 | Picco et al. |
| 2009/0187285 A1 | 7/2009 | Yaney et al. |
| 2009/0240380 A1 | 9/2009 | Shah et al. |
| 2010/0106641 A1 | 4/2010 | Chassin et al. |
| 2010/0107173 A1 | 4/2010 | Chassin |
| 2010/0114387 A1 | 5/2010 | Chassin |
| 2010/0169226 A1 | 7/2010 | Lymbery et al. |
| 2010/0185557 A1 | 7/2010 | Hunter et al. |
| 2010/0207728 A1 | 8/2010 | Roscoe et al. |
| 2010/0306014 A1* | 12/2010 | Chow .................................. 705/8 |
| 2010/0332373 A1 | 12/2010 | Crabtree et al. |
| 2011/0172973 A1* | 7/2011 | Richards et al. .................. 703/2 |
| 2011/0175750 A1 | 7/2011 | Anderson et al. |
| 2011/0231213 A1 | 9/2011 | Anderson et al. |
| 2011/0264276 A1 | 10/2011 | Kressner et al. |
| 2011/0282703 A1 | 11/2011 | Chow et al. |
| 2012/0029677 A1 | 2/2012 | Havener et al. |
| 2012/0072039 A1 | 3/2012 | Anderson et al. |
| 2012/0146799 A1 | 6/2012 | Bell et al. |
| 2012/0197558 A1 | 8/2012 | Henig et al. |
| 2012/0200423 A1 | 8/2012 | DiLuciano et al. |
| 2013/0073488 A1 | 3/2013 | Anderson et al. |
| 2013/0080205 A1 | 3/2013 | Anderson et al. |
| 2013/0138482 A1* | 5/2013 | Anderson et al. ............ 705/7.37 |
| 2013/0158725 A1 | 6/2013 | Anderson et al. |

FOREIGN PATENT DOCUMENTS

| | | |
|---|---|---|
| EP | 2 377 217 | 10/2011 |
| WO | WO 93/03401 | 2/1993 |
| WO | WO 2007/087537 | 2/2007 |
| WO | WO 2007/136456 | 11/2007 |

OTHER PUBLICATIONS

Rudin, Cynthia, et al., A process for predicting manhole events in Manhattan, Jan. 28, 2010, Machine Learning 80.1, pp. 1-31.*
Gross, Philip, et al., Predicting electricity distribution feeder failures using machine learning susceptibility analysis, 20 05, Proceedings of the National Conference on Artificial Intelligence. vol. 21. No. 2. Menlo Park, CA; Cambridge, MA; London; AAAI Press; MIT Press; pp. 1-7.*
Rudin et al., Predicting Vulnerability to Serious Manhole Events in Manhattan : A Preliminary Machine Learning Approach, 2008, Columbia University, pp. 1-35.*
Gross, Philip, et al., Ranking electrical feeders of the New York power grid., Machine Learning and Applications, 2009. ICMLA'09. International Conference on. IEEE, pp. 1-7.*
Radeva, Axinia, et al., Report cards for manholes: Eliciting expert feedback for a learning task., 2009, Machine Learning and Applications, ICMLA'09. International Conference on. IEEE, pp. 1-6.*
Dutta, Haimonti, et al., Estimating the Time Between Failures of Electrical Feeders in the New York Power Grid, 2009, Next Generation Data Mining Summit, NGDM, pp. 1-5.*
Becker, Hila, and Marta Arias., Real-time ranking with concept drift using expert advice, 2007, Proceedings of the 13th ACM SIGKDD international conference on Knowledge discovery and data mining. ACM, pp. 86-94.*
Rudin et al., Machine Learning for New York City Power Grid, Jun. 11, 2010, IEEE Transactions on Pattern Analysis and Machine Intelligence, Springer Science vol. 80, No. 1, Jul. 2010, pp. 1-21.*
U.S. Appl. No. 13/274,770 (Abandoned), filed Oct. 17, 2011.
U.S. Appl. No. 12/885,750 (US 2011/0175750), filed Sep. 20, 2010 (Jul. 21, 2011).
U.S. Appl. No. 12/885,800 (US 2011/0231213), filed Sep. 20, 2010 (Sep. 22, 2011).
U.S. Appl. No. 12/019,347 (US 2008/0294387), filed Jan. 24, 2008 (Nov. 27, 2008).
U.S. Appl. No. 11/349,711 (US 7,395,252), filed Feb. 8, 2006 (Jul. 1, 2008).
U.S. Appl. No. 12/045,458 (US 8,036,996), filed Mar. 10, 2008 (Oct. 11, 2011).
U.S. Appl. No. 12/178,553 (US 7,945,524), filed Jul. 23, 2008 (May 17, 2011).
U.S. Appl. No. 13/214,057 (US 2012/0072039), filed Aug. 19, 2011 (Mar. 22, 2012).
U.S. Appl. No. 13/274,770 (Abandoned), filed Jul. 23, 2008.
U.S. Appl. No. 13/479,198 (Abandoned), filed May 23, 2012.
U.S. Appl. No. 13/589,737 (US 2013/0073488), filed Aug. 20, 2012 (Mar. 21, 2013).
U.S. Appl. No. 13/589,916 (US 2013/0158725), filed Aug. 20, 2012 (Jun. 20, 2013).
U.S. Appl. No. 12/777,803 (US 2011/0282703), filed May 11, 2010 (Nov. 17, 2011).
U.S. Appl. No. 12/909,022 (US 2011/0264276), filed Oct. 21, 2010 (Oct. 27, 2011).
U.S. Appl. No. 13/646,939 (US 2013/0080205), filed Oct. 8, 2012 (Mar. 28, 2013).
U.S. Appl. No. 13/274,770, Jun. 8, 2012 Notice of Abandonment.
U.S. Appl. No. 12/019,347, Sep. 11, 2013 Issue Fee payment.
U.S. Appl. No. 12/019,347, Jun. 26, 2013 Notice of Allowance.

U.S. Appl. No. 12/019,347, Nov. 17, 2011 Advisory Action.
U.S. Appl. No. 12/019,347, Oct. 24, 2011 Amendment and Request for Continued Examination (RCE).
U.S. Appl. No. 12/019,347 Jul. 25, 2011 Final Office Action.
U.S. Appl. No. 12/019,347 Jun. 8, 2011 Response to Non-Final Office Action.
U.S. Appl. No. 11/349,711, Mar. 13, 2008 Issue Fee payment.
U.S. Appl. No. 11/349,711, Feb. 22, 2008 Notice of Allowance.
U.S. Appl. No. 11/349,711, Dec. 14, 2007 Response to Non-Final Office Action.
U.S. Appl. No. 11/349,711, Aug. 17, 2007 Non-Final Office Action.
U.S. Appl. No. 12/045,458, Sep. 6, 2011 Issue Fee payment.
U.S. Appl. No. 12/045,458, Jun. 3, 2011 Notice of Allowance.
U.S. Appl. No. 12/045,458, May 10, 2011 Response to Non-Final Office Action.
U.S. Appl. No. 12/045,458, Jan. 10, 2011 Non-Final Office Action.
U.S. Appl. No. 12/045,458, Oct. 28, 2010 Response to Non-Final Office Action.
U.S. Appl. No. 12/045,458, Apr. 30, 2010 Non-Final Office Action.
U.S. Appl. No. 12/178,553, Apr. 5, 2011 Issue Fee payment.
U.S. Appl. No. 12/178,553, Jan. 7, 2011 Notice of Allowance.
U.S. Appl. No. 12/178,553, Dec. 2, 2010 Response to Non-Final Office Action.
U.S. Appl. No. 12/178,553, Jun. 4, 2010 Non-Final Office Action.
U.S. Appl. No. 12/885,800, Jul. 18, 2013 Amendment and Request for Continued Examination (RCE).
U.S. Appl. No. 12/885,800, Feb. 21, 2013 Final Office Action.
U.S. Appl. No. 12/885,800, Nov. 6, 2012 Response to Non-Final Office Action.
U.S. Appl. No. 12/885,800, Jul. 9, 2012 Non-Final Office Action.
U.S. Appl. No. 13/646,939, Sep. 6, 2013 Final Office Action.
U.S. Appl. No. 13/646,939, Aug. 2, 2013 Response to Non-Final Office Action.
U.S. Appl. No. 13/646,939 Apr. 2, 2013 Non-Final Office Action.
U.S. Appl. No. 12/909,022, Aug. 15, 2013 Final Office Action.
U.S. Appl. No. 12/909,022, Aug. 6, 2013 Response to Non-Final Office Action.
U.S. Appl. No. 12/909,022, Mar. 14, 2013 Non-Final Office Action.
U.S. Appl. No. 12/777,803, Jul. 8, 2013 Notice of Allowance.
U.S. Appl. No. 12/777,803, Jun. 17, 2013 Response to Non-Final Office Action.
U.S. Appl. No. 12/777,803, Apr. 1, 2013 Non-Final Office Action.
U.S. Appl. No. 13/589,737, Aug. 29, 2013 Response to Non-Final Office Action.
U.S. Appl. No. 13/589,737, Jun. 5, 2013 Non-Final Office Action.
U.S. Appl. No. 13/214,057, Sep. 18, 2013 Restriction Requirement.
Shervais, "Adaptive Critic Based Adaptation of a Fuzzy Policy Manager for a Logistic System", *IEEE*, 0-7803-7078, pp. 568-573 (2001).
Begg et al., "The Value of Flexibility in Managing Uncertainty in Oil and Gas Investments", *SPE 77586*, pp. 1-10 (2002).
Saputelli et al., "Real-time Reservoir Management: A multiscale adaptive optimization and control approach", [Online] Downloaded Nov. 29, 2010. *Computational Geosciences Springer 2006*, http://www.springerlink.com/content/4175n8841743684v/fulltext.pdf; vol. 10: 61-96.
Long et al., "Martingale Boosting", *Colt 2005, LNAI 3559*, pp. 79-94 (Jun. 2005).
Auer et al., Learning Theory, 18th Annual Conference on Learning Theory, Colt 2005, Bertinoro, Italy, Jun. 27-30, 2005, Proceedings. *Lecture Notes in Computer Science*, 3559.
Kong et al., "Web-based monitoring of real-time ECG data", *Computers in Cardiology*, 27: 189-192 (2000).
Hanley, et al., "The meaning and use of the area under a receiver operating characteristic (ROC) curve", *Radiology*, 143: 29-36 (Apr. 1982).
Zdrallek, "Reliability centered maintenance strategy for high voltage networks", *8th International Conference on Probabilistic Methods Applied to Power Systems*, pp. 332-337 (Sep. 2004).
Gross, et al., "Predicting electricity distribution feeder failures using machine learning susceptibility analysis", *AAAI, Proceedings of the 18th Conference on Innovative Applications of Artificial Intelligence*, pp. 1705-1711 (2006).

Warwick, et al., Shortened version of chapter 6 of the book "Artificial intelligence techniques in power systems", *IEE Power Engineering Series 22*, pp. 109-122 (1997).
Venayagamoorthy, et al., "Experimental studies with continually online trained artificial neural networks identifiers for multiple turbogenerators on the electric power grid", 2001, *IEEE*, 0/7803-7044, pp. 1267-1272.
Rajan, "Demand Side Management Using Expert Systems: 2003, TENCON 2003, Conference on Convergent Technologies for Asia-Pacific Region" *IEEE*, 0-7803-7651. (2003).
Rudin et al., "Predicting Vulnerability to Serious Manhole Events in Manhattan: A Preliminary Machine Learning Approach", Submitted for Journal, Dec. 2008, Retrieved online on Nov. 29, 2011 at : <http://www1.ccls.columbia.edu--rudin/RudinEtAI2008_ManholeEvents.pdf>, Entire Document.
Barry et al., "Applications of Learning Classifier Systems, Data Mining using Learning Classifier Systems", Springer, May 27, 2004, pp. 15-67, Retrieved online Nov. 29, 2011 at : <http://books.google.com/books?id=aBljqGag5kC&lr=&source=gbs_navlinks_s>.
Bickel, et al., "Semiparametric Inference and Model", Sep. 5, 2005 [retrieved on Jul. 23, 2012] Retrieved from the internet: URL:http://www.stat.washington.edu/jaw/JAW-papers/NR/jaw-BKR-EncylSS.pdf entire document.
Liu, et al., "Weighted Nonparametric Maximum Likelihood Estimate of a Mixing Distribution in Nonrandomized Clinical Trials", Feb. 20, 2006 [retrieved on Jul. 23, 2012] Retrieved from Internet: URL:HTTP://www.stat.purdue.edu/~junxie/Papers/weightedSBR.pdf> entire document.
Cameron, "Microeconometrics: Methods and Applications", *Cambridge University Press*, p. 333 (2005).
Bhatt, "The Application of Power Quality Monitoring Data for Reliability Centered Maintenance" EPRI (Electric Power Research Institute, Inc.) 152 pages. (2000).
International Search Report for PCT/US2004/28185, dated Feb. 11, 2005.
International Search Report for PCT/US2010/024955, dated Apr. 23, 2010.
International Search Report for PCT/US2010/036717, dated Jul. 28, 2010.
International Search Report and Written Opinion for PCT/US2009/037996, dated May 19, 2009.
International Search Report and Written Opinion for PCT/US2009/037995, dated Mar. 23, 2009.
International Search Report and Written Opinion for PCT/US2011/044389, dated Dec. 14, 2011.
International Search Report and Written Opinion for PCT/US2012/050439, dated Oct. 22, 2012.
International Search Report and Written Opinion for PCT/US2012/033309, dated Aug. 1, 2012.
International Search Report and Written Opinion for PCT/US2012/056321, dated Dec. 7, 2012.
Amoedo, "A Structured Methodology for Identifying Performance Metrics and Monitoring Maintenance Effectiveness", *M.S. Dissertation, University of Maryland, College Park, United States*, (2005).
Barabady, et al. "Availability Allocation Through Importance Measures", *The International Journal of Quality & Reliability Management*, 24(6):643-657 (2007).
Chen, "Distributed Multi-Modal Human Activity Analysis: From Algorithms to Systems",*Ph.D. dissertation, Princeton University, United States, New Jersey*, (Retrieved Mar. 25, 2012).
Hobbs, "Optimization Methods for Electric Utility Resource Planning", *European Journal of Operational Research*, pp. 1-20 (May 18, 1995).
Keeney, et al., "Evaluating Improvements in electricity Utility Reliability at British Columbia Hydro", *Operations Research*, 43(6):933-947 (Nov./Dec. 1995).
Naidu, et al., "An Empirical Model for Maintenance Strategy Selection Based on Organization Profit", *Proceedings of the 2009 Industrial Engineering Research Conference*, pp. 1765-1770 (Jan. 2009).
Chambal, "Advancing Reliability, Maintability, and Availability Analysis Through a Robust Simulation Environment", *Ph.D. Dissertation, Arizona State University, United States* (1999).

Chen, "Performance and Control of Parallel Multi-Server Queues with Applications to Web Hosting Services", *Ph.D. Dissertation, The Pennsylvania state University, United States* (2006).

Doukas, et al., "Intelligent Building Energy Management System Using Rule Sets", *Building and Environment*, 42:3562-3569 (2007) [online]. Retrieved Oct. 29, 2012 from URL:<http://www.aseanbiotechnology.info/Abstract/21024252.pdf>.

Ma, "Online Supervisory and Optimal Control of Complex Building Central Chilling Systems", [online], dated Apr. 2008. Retrieved on Oct. 29, 2012 from URL:<http://repository.lib.polyu.edu.hk/jspui/bitstream/10397/3415/2/b2239753x_ir.pdf>.

Martin, "Optimal Prediction, Alarm, and Control in Buildings Using thermal Sensation Complaints", [online] Fall 2004. Retrieved on Oct. 29, 2012 from URL:<http://ti.arc.nasa,gov/m/pub-archive/archive/PhDThesis.pdf>.

Trcka, "Co-Simulation for Performance Prediction of Innovative Integrated mechanical Energy Systems in Buildings", [online] Oct. 8, 2008. Retrieved on Oct. 29, 2012 from URL:<http://www.bwk.tue.nl/bps/hensen/team/past/Trcka.pdf>.

Lundgren, "Implementing Service model Visualizations: Utilizing Hyperbolic Tree Structures for Visualizing Service Models in Telecommunication Networks", *Institutionen for Informatik*, 30 pages (2009).

Dutta, et al., "Estimating the Time Between Failures of Electrical Feeders in the New York Power Grid", *Next Generation Data Mining Summit*, NGDM, 5 pages (2009).

U.S. Appl. No. 14/137,381, filed Dec. 20, 2013
U.S. Appl. No. 13/214,057, Jan. 2, 2014 Non-Final Office Action.
U.S. Appl. No. 13/646,939, Jan. 7, 2014 Notice of Allowance.

Chen, et al., "Particle Swarm Optimization for Next Generation Smart Grid Outage Analyses", *IEEE Transmission and Distribution Conference and Exposition*, pp. 1-6 (2012).

Choi, et al., "The Design of Outage Management System Utilizing Meter Information Based on AMI (Advanced Metering Infrastructure) system", *IEEE, 8th International Conference on Power Electronics - ECCE Asia*, pp. 2955-2961 (May 30 - Jun. 30, 2011).

Russell, et al., "Intelligent Systems for Improved Reliability and Failure Diagnosis in Distribution Systems", *IEEE Transactions on Smart Grid*, 1(1):48-56 (2010).

Zhu, et al., "Lassoing Line Outages on the Smart Power Grid", *IEEE International Conference of Smart Grid Communications*, pp. 570-575 (2011).

* cited by examiner

*Primary Examiner* — David Vincent
(74) *Attorney, Agent, or Firm* — Baker Botts, LLP

(57) ABSTRACT

A machine learning system for ranking a collection of filtered propensity to failure metrics of like components within an electrical grid that includes a raw data assembly to provide raw data representative of the like components within the electrical grid; (b) a data processor, operatively coupled to the raw data assembly, to convert the raw data to more uniform data via one or more data processing techniques; (c) a database, operatively coupled to the data processor, to store the more uniform data; (d) a machine learning engine, operatively coupled to the database, to provide a collection of propensity to failure metrics for the like components; (e) an evaluation engine, operatively coupled to the machine learning engine, to detect and remove non-complying metrics from the collection of propensity to failure metrics and to provide the collection of filtered propensity to failure metrics; and (f) a decision support application, operatively coupled to the evaluation engine, configured to display a ranking of the collection of filtered propensity to failure metrics of like components within the electrical grid.

22 Claims, 25 Drawing Sheets

MORINO (SPLICER) CLAIMS CONDITION YELLOW F/O 411 W.95 ST.
ALSO————(LOW VOLTAGE TO PARKING GARAGE_————JEC
01/26/00 08:57 MDE.VETHI DISPATCHED BY 71122 01/26/00 09:21
MDE.VETHI ARRIVED BY 23349
01/26/00 11:30 VETHI REPORTS: FOUND COVER ON NOT SMOKING..
SB-110623 F/O 413 W.95 ST..1 AC LEG COPPERED..CUT CLEARED
AND REJOINED....MADE REPAIRS TO DC CRABS.. ALL B/O CLEARED
CO=0PPM——▶SB-110623 F/O 413 W.95 ST
01/26/00 11:34 MDE.VETHI COMPLETE          BY 23349
************ELIN REPORT MADE OUT************MC

FIG. 3

```
ticket: ME00016965
lines: 28
remarks: MANHOLE IS SMOKING VERY BAD
05/18/00 04:10 MDELBROWN DISPATCHED                BY 05198
05/18/00 04:25 MDELBROWN ARRIVED                   BY 05198
05/18/00 04:35 LBROWN REPORTS N/A TO BOX F/O 110 SOUTH ST.
DUE TO HEAVY FISH MARKET TRAFFIC..BOX SMOKING LIGHTLY...
CHECKING CO READINGS AT THIS TIME..WILL HAVE ACCESS TO BOX
AFTER 09:00 HRS........................TT
05/18/00 05:45 L.BROWN REPORTS THE FOLLOWING READINGS:
CO=0 PPM 05/18/00 05:30 SB-346884 F/O# 119 SOUTH STREET
CG=0% OX=20.0%
*********************************************************
05/21/00 09:50 MDERODRIQUEZ REPORTS FLUSH COMPLETE
CLEARING B/O,S IN SB-346884 F/O 119 SOUTH----JMC
05/21/00 11:00 BODRIGUEZ REPORTS ALL B/O'S CLEARED
IN SB-346884 F/O 119 SOUTH ST... JOB COMPLETE.. PM
05/21/00 11:00 MDERODRIQU COMPLETE                 BY 58101
*****************ELIN REPORT MADE OUT*************MC

SEE TICKET ME00016967
```

```
01/11/00 18:17 VETH REPORTS IN SB-726260 N/E/C PRINCE ST &
MERCER ST FOUND 7-4/0 & 2-500, 1-200 BLOWN OUT OF SOUTH DUCT
CUT FOR PLACEMENT 7-4/0, 4"23' AND 2-500, 1-200, 3" 1-10NEUT 3"
23" FROM SB-726260 N/E/C PRINCE ST & MERCER ST TO MH-641008
```

Free text lines: 19

Serious Metadata

Structure Names
"Trouble hole" is structure mentioned most often

Shunts and Cleared

Referred Tickets

Cable Sizes

FIG. 10

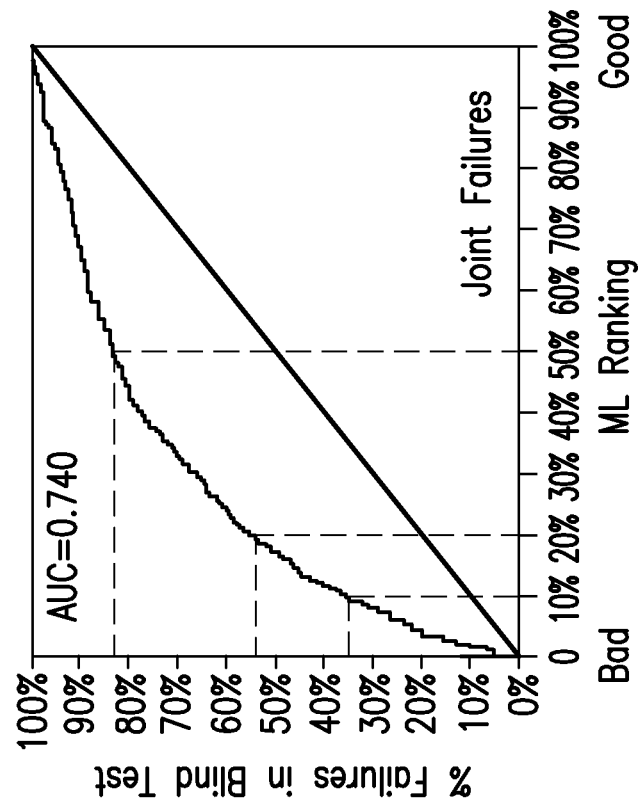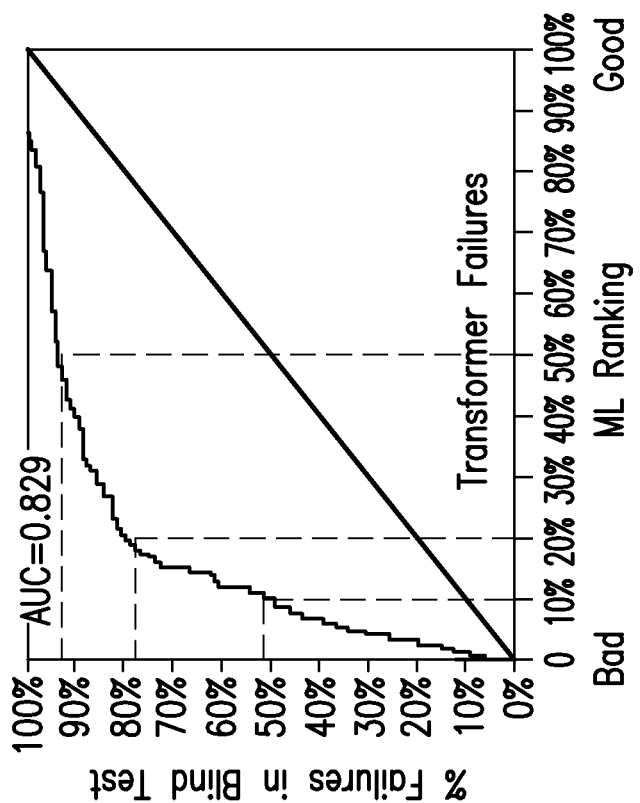
FIG. 12B

MACHINE LEARNING FOR POWER GRID

This application is a continuation of International Patent Application No. PCT/US2011/044389, filed Jul. 18, 2011 and claims the benefit of U.S. Provisional Application No. 61/364,988, filed Jul. 16, 2010, the contents of both of which are hereby incorporated by reference in their entireties herein.

BACKGROUND

One of the major findings of the U.S. Department of Energy's "Grid 2030" strategy is that "America's electric system, 'the supreme engineering achievement of the 20th century' is aging, inefficient, congested, incapable of meeting the future energy needs [ . . . ]." Reliability will be a key issue as electrical grids transform throughout the next several decades, and grid maintenance will become even more critical than it is currently. A 2007 survey by the NERC stated that "aging infrastructure and limited new construction" is the largest challenge to electrical grid reliability out of all challenges considered by the survey. The Smart Grid will bring operations and maintenance more online—moving the industry from reactive to proactive operations. Power companies keep historical data records regarding equipment and past failures, but those records are generally not being used to their full extent for predictive maintenance and assisting grid reliability.

Most power grids in U.S. cities (e.g., electrical grids in the Northeast and other mature cities) have been built gradually over the last 120 years. This means that the electrical equipment (transformers, cables, joints, terminators, and associated switches, network protectors, relays, etc.) vary in age; for instance, at least 5% of the low voltage cables in Manhattan were installed before 1930, and a few of the original high voltage feeder sections installed during the Thomas Edison era are still in active use in NYC. In NYC there are over 94,000 miles of high voltage underground distribution cable, enough to wrap around the earth three and a half times. Boston has 3,000 miles of underground cable and many other cities have similarly large underground electric systems.

Maintaining a large grid that is a mix of new and old components is more difficult than managing a new grid (for instance, as is being laid in some parts of China). The U.S. grid is generally older than many European grids that were replaced after WWII, and older than grids in places where infrastructure must be continually replenished due to natural disasters (for instance, Japan has earthquakes that force power systems to be replenished).

The Smart Grid will not be implemented overnight. For instance, according to the Brattle Group, the cost of updating the grid by 2030 could be as much as $1.5 trillion. The major components of the Smart Grid will (for an extended period) be the same as the major components of the current grid, and new intelligent meters must work with the existing equipment. Converting to a Smart Grid has been compared to "replacing worn parts of a 747 while it's in the air." To create the Smart Grid of the future, one must work with the electric grid that is there now. As grid parts are replaced gradually and as smart components are added, the old components, including cables, switches, sensors, etc., will still need to be maintained. Further, the state of the old components should dictate priorities for the addition of new smart switches and sensors, particularly in the secondary network.

The key to making Smart Grid components effective is to analyze where upgrades would be most useful, given the current system. Consider the analogy to human patients in the medical profession, a discipline for which many of the machine learning algorithms and techniques used for the Smart Grid were originally developed and tested. While each patient is made up of the same kinds of components (analogous to feeders, transformers, manholes, and joints), they wear and age differently, with variable historic stresses and hereditary factors (analogous to different vintages, loads, manufacturers) so that each patient must be treated as a unique individual. Nonetheless individuals group into families, neighborhoods, and populations (analogous to feeders, networks, boroughs) with relatively similar properties. The Smart Grid must be built upon a foundation of helping the electrical grid components (patients) improve their health, so that the networks (neighborhoods) improve their life expectancy, and the population (boroughs) lives more sustainably.

A need exists for proactive predictive maintenance programs for electrical grid reliability. There is also a need to make use of existing data resources, including data resources that were not originally obtained or designed for predictive purposes (e.g., maintenance record or a maintenance requests).

SUMMARY

The presently disclosed subject matter provides methods and systems for proactive predictive maintenance programs for electrical grid reliability, including, but not limited to, robust, mature urban electrical grids in need of process component upgrades (e.g., the New York City electrical grid). For example, the methods and systems of the present application, via machine learning, provide for proactive predictive maintenance of secondary components in electrical grid based on improved machine learning techniques and making use of data, obtained in the ordinary course of grid management, which was not designed for predictive purposes.

One aspect of the presently disclosed subject matter provides a machine learning system for ranking a collection of filtered propensity to failure metrics of like components within an electrical grid that includes a raw data assembly to provide raw data representative of the like components within the electrical grid; (b) a data processor, operatively coupled to the raw data assembly, to convert the raw data to more uniform data via one or more data processing techniques; (c) a database, operatively coupled to the data processor, to store the more uniform data; (d) a machine learning engine, operatively coupled to the database, to provide a collection of propensity to failure metrics for the like components; (e) an evaluation engine, operatively coupled to the machine learning engine, to detect and remove non-complying metrics from the collection of propensity to failure metrics and to provide the collection of filtered propensity to failure metrics; and (f) a decision support application, operatively coupled to the evaluation engine, configured to display a ranking of the collection of filtered propensity to failure metrics of like components within the electrical grid.

In one embodiment, the raw data representative of the like components is obtained at least in part from a maintenance record or a maintenance request for at least one of the like components. Te data processing techniques can include one or more of an inferential join, pattern matching, information extraction, text normalization, querying overlapping data to find inconsistencies, and inference from related or duplicate records.

In one embodiment, the non-complying metrics are detected based on one or more of AUC, weighted Area Under the Receive Operating Characteristic (ROC) Curve (AUC), and pre-defined percentage fail exclusion. The evaluation engine can further include an outage derived database to store outage derived data sets (ODDS) that capture dynamic precursor to fail data representative of at least one of the like components.

In one embodiment, dynamic precursor to fail data is obtained from a time-shifted time domain ending at the time of, or just before, the failure and beginning at a pre-selected time prior to the failure. In one embodiment, the like components are secondary network components selected from cables, joints, terminators, hammerheads, manholes and transformers. In one embodiment the like components are manholes. The propensity to failure metric, in one embodiment, can be selected from mean time between failure (MTBF) and mean time to failure (MTTF).

In one embodiment, the evaluation engine includes a data historian to record a collection of filtered propensity to failure metrics over a first time period and a collection of filtered propensity to failure metrics over a second time period, and a data analyzer to determine whether the collection of filtered propensity to failure metrics at the first time period is statistically improved over the collection of filtered propensity to failure metric at the second time period.

Another aspect of the presently disclosed subject matter provides a method for ranking a collection of filtered propensity to failure metrics of like components in an electrical grid via machine learning that includes (a) providing a raw data assembly to provide raw data representative of the like components within the electrical grid; (b) processing the raw data to convert the raw data to more uniform data via one or more data processing techniques; (c) storing the more uniform data in a database; (d) transmitting the more uniform data to a machine learning engine to provide a collection of propensity to failure metrics for the like components; (e) evaluating the collection of propensity to failure metrics in an evaluation engine to detect and remove non-complying metrics from the collection of propensity to failure metrics and to provide the collection of filtered propensity to failure metrics; and (f) ranking the collection of filtered propensity to failure metrics obtained from the evaluation engine and displaying the ranking on a decision support application.

Further details regarding the method will be understood from description of the corresponding system. Further details regarding the system will be understood from description of the corresponding method.

BRIEF DESCRIPTION OF THE DRAWINGS

FIG. 3 is an excerpt from a sample smoking manhole (SMH) trouble ticket in New York City. A trouble ticket is an example of a maintenance record.

FIG. 10 demonstrates processing of a trouble ticket.

FIG. 12A-12B is a depiction of Area Under Curve for ROC curves in blind tests of the machine learning ranking of specific components at the time of their failure.

DETAILED DESCRIPTION

Power companies can greatly benefit from the use of knowledge discovery methods and statistical machine learning for preventive maintenance. Methods and systems are provided for transforming historical electrical grid data into predictive models that can be used directly by power companies. Specialized versions of this process can be used to produce, for example, 1) feeder failure rankings, 2) cable, joint, terminator and transformer rankings, 3) feeder and component MTBF (Mean Time Between Failure) estimates and 4) the manhole events vulnerability rankings. The methods and systems can handle diverse, noisy, sources that are historical (static), semi-real-time, or real-time, incorporates state-of-the-art machine learning algorithms for prioritization (supervised ranking or MTBF), and includes an evaluation of results via cross-validation and blind testing. Above and beyond the ranked lists and MTBF estimates are business management interfaces that allow the prediction capability to be integrated directly into corporate planning and decision support; such interfaces rely on several important properties of our general modeling approach: that machine learning features are meaningful to domain experts, that the processing of data is transparent, and that prediction results are accurate enough to support sound decision making. The challenges in working with historical electrical grid data that was not designed for predictive purposes, and how these challenges were addressed is discussed. The "rawness" of this data contrasts with the accuracy of the statistical predictive models that can be obtained from the process; these models are sufficiently accurate to be used to plan the maintenance of New York City's electrical grid, according to one specific illustrative embodiment.

Solely for purpose of convenience, the presently disclosed methods and systems are described in connection with the NYC electrical grid. It is understood, however, that the presently disclosed subject matter is transferable to electrical grids across the world.

Figure 1:
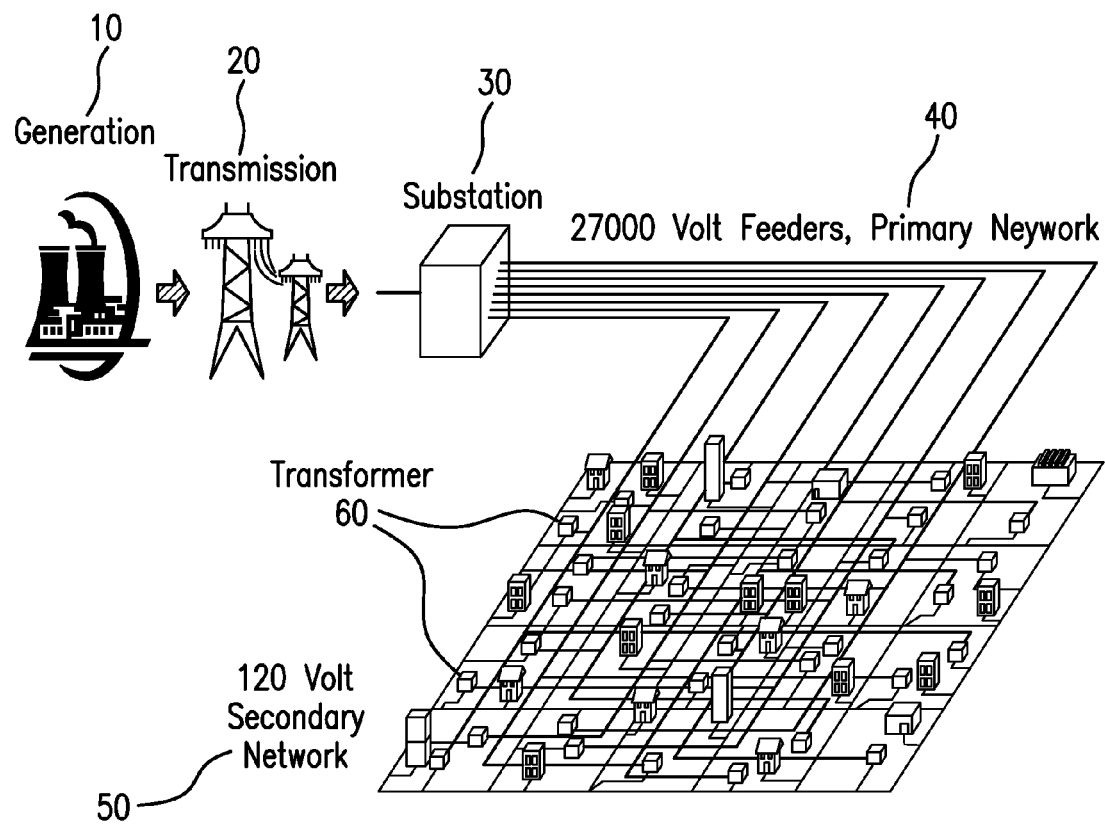
FIG. 1 is a depiction of a typical electrical grid in an urban environment (source: Con Edison).

In one non-limiting embodiments, the methods and systems provide propensity to failure metrics of secondary grid components. As used herein, secondary grid components refers to components located downstream from the primary network electrical feeder cables. For example, as shown in FIG. 1, the electrical grid can be summarized as consisting of a generation stage (10) (e.g. nuclear power from a nuclear power plant), a transmission stage (20) which terminates at a substation (30). From the substation, electricity is transmitted via a primary network, the primary network concluding at feeders cables (40) (e.g., 27,000 volt feeders and including "distribution feeders" and "transmission feeders."). The network downstream from the feeders is considered the secondary network (50). Components located downstream from the primary network feeder cables are considered the secondary network grid components, and include, but are not limited to, transformers (60), as well as joints, terminators, hammerheads, and manholes (not shown).

From a technical standpoint, secondary network components differ from primary network components by the magnitude of voltage, and due to the secondary network being connected via a "mesh" structure in which there is built-in redundancy.

Technologies are disclosed herein for maintaining the smart grid, in the form of a process for failure prediction that can be specialized for individual applications. The presently disclosed subject matter provides data processing (cleaning, pattern matching, statistics, integration), formation of a database, machine learning (time aggregation, formation of features and labels, ranking methods), and evaluation (blind tests, visualization). Specialized versions of the process have been developed, in certain embodiments, for: 1) feeder failure ranking for distribution feeders, 2) cable, joint, terminator and transformer ranking for distribution feeders, 3) feeder and component MTBF (Mean Time Between Failure) estimates for distribution feeders, and 4) manhole vulnerability ranking. Each process can handle data with particular characteristics. In its most general form, the process can handle diverse, noisy, sources that are historical (static), semi-real-time, or real-time, incorporates machine learning algorithms for prioritization (supervised ranking or MTBF), and includes an evaluation of results via cross-validation on past data, and by blind evaluation. The blind evaluation can be performed on data generated as events unfold, giving a true barrier to information in the future. The data used by the machine learning algorithms can include past events (failures, replacements, repairs, tests, loading, power quality events, etc.) and asset features (type of equipment, environmental conditions, manufacturer, specifications, components connected to it, borough where it is installed, specific network, dates of installation, repair or test, etc.).

Beyond the ranked lists and MTBF estimates, graphical user interfaces have been designed that can be used by managers and engineers for planning and decision support. Successful NYC grid decision support applications that have been built based on our models include, but are not limited to, repair prioritization, inspection prioritization, correcting of overtreatment, replacement plan generation, and system protective action prioritization. The usefulness of these interfaces can be obtained, at least in part, from the predictive accuracy of the underlying models, and also on the interpretation of model results.

One important property of the approach of the presently disclosed methods and systems is that machine learning features are meaningful to domain experts, and that the processing of data and design of causal factors responsible for predictions is transparent. The transparent use of data serves several purposes: it allows domain experts to troubleshoot the model or suggest extensions, it allows users to find the factors underlying the root causes of failures, and it allows managers to understand, and thus trust, the (non-black-box) model in order to make decisions.

The presently disclosed subject matter demonstrates that data collected by electrical utilities can be used proactively for predictive maintenance programs via machine learning providing effective prediction and decision-support applications.

The organization of the detailed description which follows is as follows: the electrical grid maintenance tasks, including rankings, predictions, or underlying properties about the components that make them good or bad, or root causes of failures is disclosed. Then, processes by which raw data can be transformed to meet these goals are disclosed. Then, the specific machine learning methods used for the knowledge discovery processes is disclosed. The specialization of these processes for four prediction tasks is also disclosed. The evaluation of the results, and sample results for the NYC power grid is disclosed. The management software developed in order to make the results useable, and to assist in knowledge discovery is disclosed. Exemplary, non-limiting systems and lessons obtained from the implementation of these systems on the NYC grid, are also disclosed.

Proactive Maintenance Tasks

Power companies are beginning to switch from reactive maintenance plans (fix when something goes wrong) to proactive maintenance plans (fix potential problems before they happen). There are advantages to this: reactive plans, which allow failures to happen, can lead to dangerous situations, for instance fires and cascading failures, and costly emergency repairs. However, it is not a simple task to determine where limited resources should be allocated in order to most effectively repair potentially vulnerable components.

In large power systems, electricity flows from source to consumer through transmission lines to substations, then to, to primary feeder cables ("feeders"), and associated sections, joints, and hammerheads, through transformers, and on to the rest of the secondary (low-voltage) electrical distribution grid. There are two types of feeders, "distribution feeders" and "transmission feeders." The presently disclosed subject matter, solely for the purpose of convenience, is discussed in connection with distribution feeders, which are large high-voltage cables (13 or 27 KV) that form a tree-like structure, with transformers at the leaves that feed the secondary network. The presently disclosed systems and methods are not limited to distribution feeders, and also encompass, for example, transmission feeders.

In some cities, these transformers serve buildings or a few customers, and a feeder failure leads to service interruptions for all downstream customers. In contrast, the secondary cables in many cities form a mesh or grid-like structure that is fed by redundant high-voltage feeders, with goal of continuing service, even if one or more feeders fail. There can be possible weaknesses in any of these components: a feeder may go out of service, the cables, joints and hammerheads can fail, transformers can fail, and insulation breakdown of cables in the secondary electrical grid can cause failures. How data-driven pre-emptive maintenance policies can assist with prevention of these failures is discussed.

Feeder Rankings

Primary distribution feeder cables are large cables; in NYC they operate at 13,600 or 27,000 volts. They generally lie along main streets or avenues and distribute power from substations to the secondary grid. (See FIG. 1).

A feeder may experience an outage due to a fault somewhere along the feeder, or due to deliberate deenergizing (so maintenance can be performed). If one component, such as a feeder, fails or is taken out of service, this failure is called a "first contingency," and if two components in the same network fail, it is called a "second contingency," and so forth. Loss of a small number of feeders generally does not result in any interruption in customers' electricity service, due to extensive built-in redundancy in the system. (For instance, an underground grid system can be designed to operate under second contingency, as described above.) However, once one or more feeders in a network are out of service, the remaining feeders and their associated transformers have to "pick up" the load of the disconnected feeders, placing them at increased risk. This added load elevates the risk of failure for the remaining feeders and transformers, and past a certain point, the network will experience a cascading failure, where the remaining distribution assets are unable to carry the network's load, and the entire network must be shut down until the system can be repaired.

Each feeder cable can consists of many cable sections ("sections"); for instance, the average number of sections per feeder in NYC is approximately 150. Each section runs between two manholes, and has "joints" at each end. Sections are often made up of three bundled cables, one for each voltage phase. Joints can attach two single cable sections, or can branch two or more ways. Ultimately feeder sections end at transformers that step down the voltage to 120 or 240 Volts needed for the secondary systems. Feeder sections connect to transformers via separable connectors ("hammerheads"). Feeder failures generally occur at the joints or within a cable section. Underground feeder failures are by far most frequent during the summer, especially during heat waves. This subsection discusses the problem of predicting whether a given feeder will have a failure (including its subcomponents: sections, joints, hammerheads). The following section discusses the prediction of failures on individual cables, joints and hammerheads.

One kind of joint, the "stop joint," can be a source of a disproportionate number of failures. Stop joints connect old "PILC" to modern cables with solid dielectrics. PILC stands for Paper-Insulated Lead-sheathed Cable, an older technology used in most urban centers from 1906 through about the 1960's. PILC sections are oil-filled, so stop joints must not only have good electrical connections and insulation (like all joints) but must also cap off the oil to prevent it from leaking. Even though all utilities are aggressively removing lead cable from their systems, it is going to be a long time before the work can be completed. For instance, in NYC, the Public Service Commission has mandated that all ~30,000 remaining PILC sections be replaced by 2020. Note however that some PILC sections have been in operation for a very long time without problems, and it is practical and important to make the best use of the limited maintenance budget by replacing the most unreliable sections first.

The feeder failure ranking application, described below, orders feeders from most at-risk to least at-risk. The data for the feeder ranking task can consists of ~300 features for each feeder along with outage histories. These data are assumed to be reasonably complete and not too noisy. Data includes: date put into service; previous OAs (Open Automatic feeder failures), scheduled work, testing, and dates; % PILC; power quality events; etc. Many summary features can be computed from the raw data, for example, the total number of OAs per feeder over the period of data collection. The model construction phase uses two years of past data to predict failures within a one-year test phase.

Figure 2:
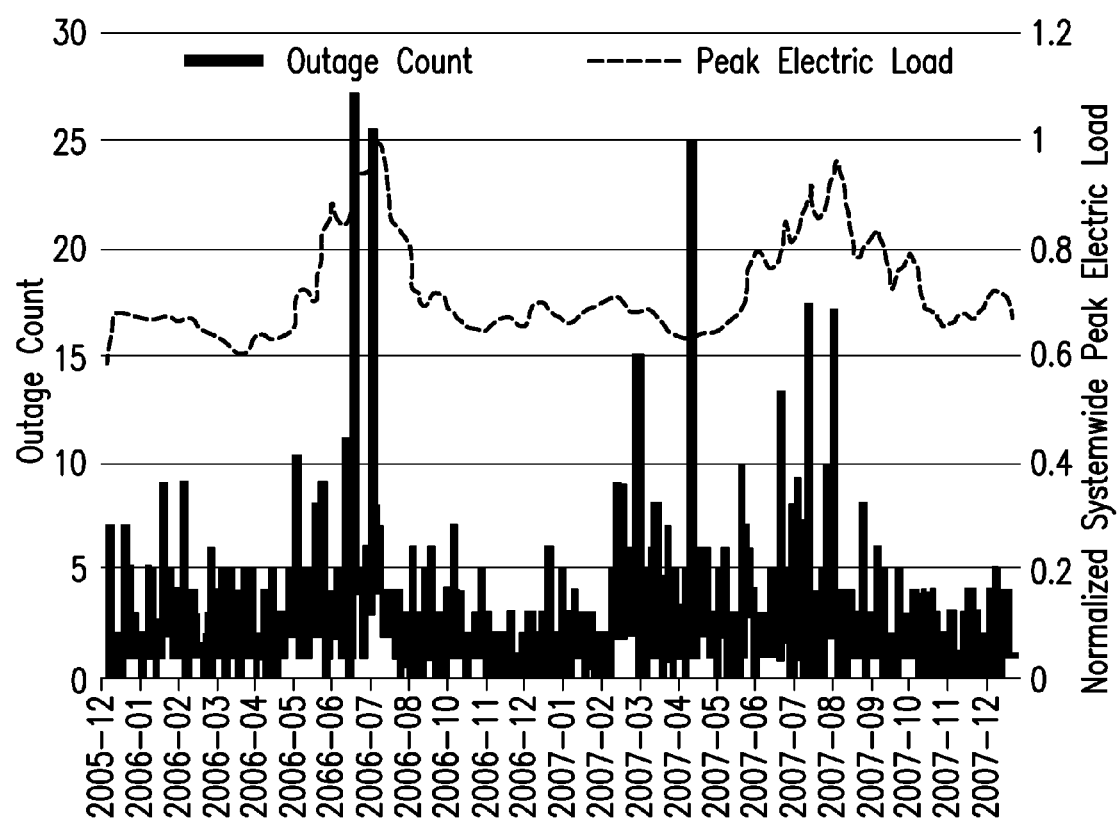
FIG. 2 is the number of feeder outages in NYC per day during 2006-2007. The outage count (lower curve, bar graph) has the x-axis on the left, and the normalized peak electrical load (upper, dashed line graph) has the axis on the right.

As can be seen in FIG. 2, a small number of feeder failures occur daily, as observed in a typical electrical grid throughout the year. The rate of failures noticeably increases during warm weather. Air conditioning units put substantial load on the system, causing electricity usage to increase by roughly 50% during the summer. It is during these times when the system is most at risk.

The feeder failure rank lists can be used to provide guidance for a utility's spring replacement program, the time of year when repairs are initiated. In the early spring of each year, a number of feeders are improved by removing PILC sections, changing the topology of the feeders to better balance loading or to support changing power requirements for new buildings. Loading is light in spring, so feeders can be taken out of service for upgrading with low risk. Prioritizing feeders is important: scheduled replacement of each section costs about $18,000, and if the section is very unlikely to fail, the money is essentially wasted relative to replacing sections that are likely to fail. Failures require more expensive emergency replacements and also carry a risk of cascading failures.

Cables, Joints, Terminators and Transformers Ranking

Cables, joints, terminators, and transformers are components of feeders that have fairly large populations. Modeling how individual components (of a multicomponent feeder) fail brings an extra level to the understanding of feeder failure. Features of the components can be more directly related to the localized failure and kept in a non-aggregated form than a similar feature rolled up for a feeder; for instance a feature for the component modeling task might encode that a PILC section was made by Okonite in 1950 whereas a feature for the feeder modeling task might instead encode a count of PILC sections greater than 40 years for the feeder. Ranking components allows for better decision support after the susceptible feeders are chosen for reliability improvement (guided by a feeder ranking). The component rankings allow a prioritization of components by susceptibility-to-failure when budget constraints prohibit replacement of the full feeder. Finally the component rankings themselves can be used to define features for the feeder ranking task. In general one could construct part-whole hierarchical learning systems guided by some credit assignment structure. For Con Edison, the data used for ranking cables, joints and hammerheads was diverse and fairly noisy, though less noisy than the data used for the manhole events prediction project, described next.

Manhole Ranking

A small number of serious "manhole events" occur each year in many cities, including fires and explosions. These events are usually caused by insulation breakdown of the low-voltage cable in the secondary network. Since the insulation can break down over a long period of time, it is reasonable to try to predict future serious events from the characteristics of past events. Events are considered within two somewhat simplified categories: "serious events" (fires, explosions, serious smoking manholes) and "potential precursor events" (burnouts, flickering lights, etc). Potential precursor events can be indicators of an area-wide network problem, or they can indicate that there is a local problem affecting only 1-2 manholes.

Many power companies keep records of all past events in the form of trouble tickets, which are the shorthand notes taken by dispatchers. An example ticket for an NYC smoking manhole event appears in FIG. 3. The machine learning techniques disclosed herein can effectively process these tickets.

MTBF (Mean Time Between Failures) Modeling

A metric for reliability performance is mean time between failures (MTBF) for components or systems that can be repaired, and mean time to failure (MTTF) for components that cannot. In lean management, MTBF is the common measure or reliability performance. Once reliability is quantified then cost vs. benefit analysis can be carried out and replacement policies, inspection policies, and reliability improvement programs can be planned.

Feeders are made up of multiple components that can fail so MTBF is applicable. Once a joint fails it is replaced, so MTTF is applicable instead.

Figure 4:
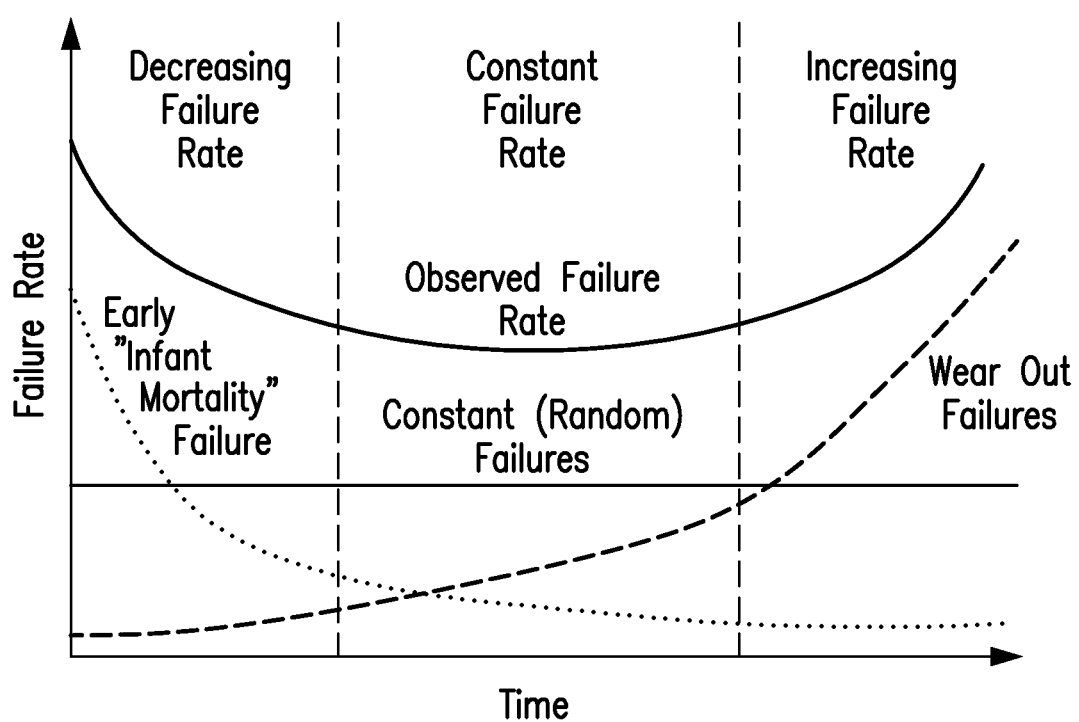
FIG. 4 is a bathtub curve (source: Wikipedia).

In general the failure rate of a component or a composite system like a feeder will have a varying MTBF over its lifetime. Something that is new or has just had maintenance may have early failures also known as "infant mortality." Then systems settle down into their mid-life with a lower failure rate and finally the failure rate increases at the end of their lifetimes. (See FIG. 4.)

PILC cable, a cable type of choice since the beginning of the power industry—but now being phased out in most utilities—can have very long lifetimes and it is hard to determine an end of life signature for them. Transformers do show aging with an increase in failure rate.

Methods and Systems for Failure Prediction in Power Grids

The general goal is "knowledge discovery," that is, finding information in data that is implicit, novel, and potentially extremely useful. Harding et al. provide an overview of knowledge discovery in manufacturing. The general Cross Industry Standard Process for Data Mining (CRISP-DM) framework captures the data processing for (potentially) extremely raw data, however the traditional knowledge discovery in databases (KDD) outline does not encompass this. The general process presented here can be considered a special case of Cross Industry Standard Process for Data Mining (CRISP-DM), but it is outside the realm of KDD due to the heavy data cleaning and processing involved in constructing the database.

Figure 5:
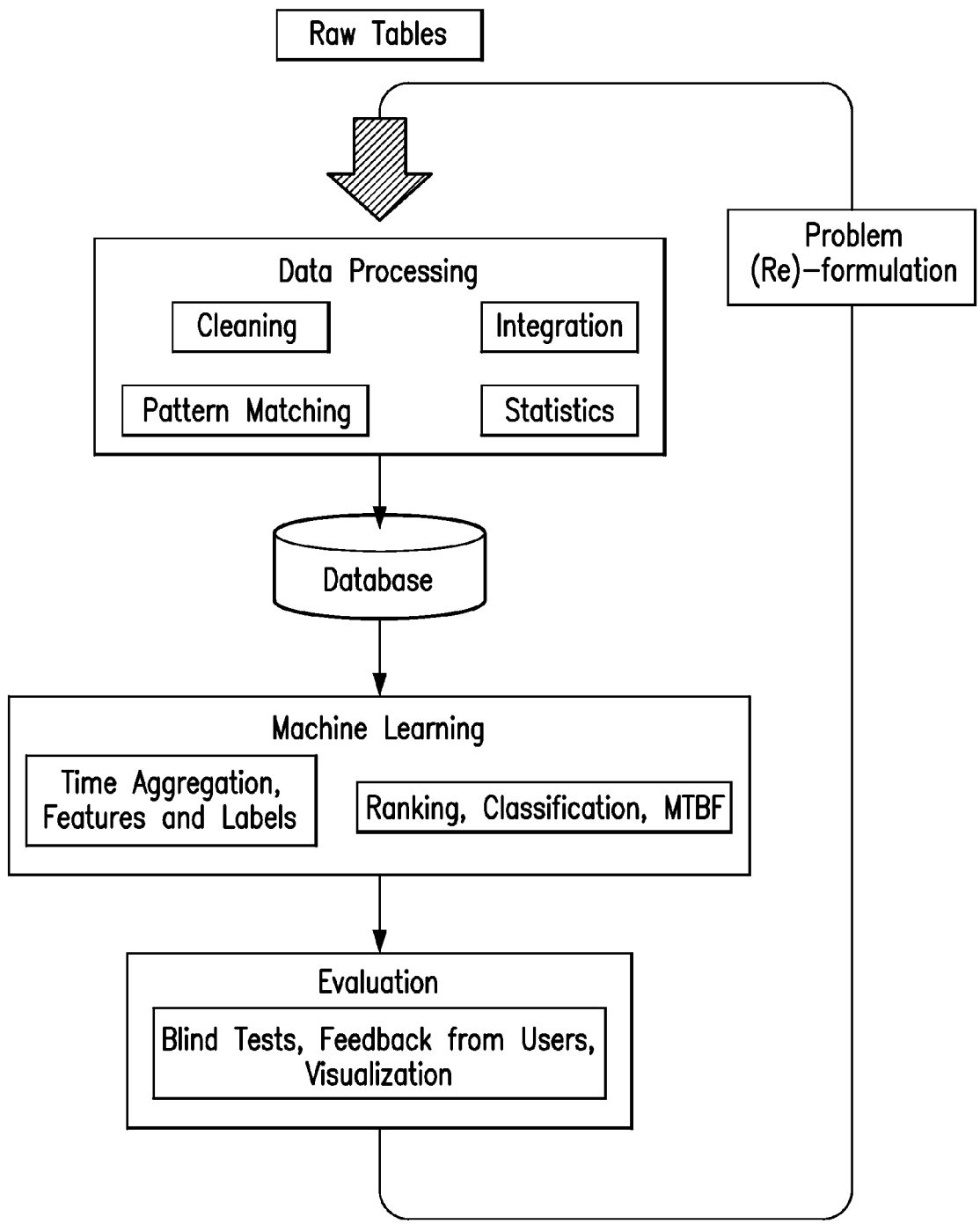
FIG. 5 is a flow diagram of a method and system for ranking a collection of filtered propensity to failure metrics of like components within an electrical grid via machine learning.

The general knowledge discovery process for power grid data is shown in FIG. 5. The data is first cleaned and integrated into a single database that can be accurately queried. Then one or more machine learning problems are formulated over an appropriate timescale. In certain embodiments, the features used in the machine learning models are meaningful to the domain experts. The parameters in the machine learning algorithm are tuned or tested by cross-validation, and evaluated for prediction accuracy blind prediction tests on data that is not in the database. Domain experts also evaluate the model using the business management tools and suggest improvements (usually in the initial handling and cleaning of data).

The data processing/cleaning is the key piece that ensures the integrity of the resulting model. This view agrees with that of Hsu et al., who state that " . . . the often neglected preprocessing and postprocessing steps in knowledge discovery are the most critical elements in determining the success of a real-life data mining application." Data cleaning issues have been extensively discussed in the literature, for instance in e-commerce. Often, the application of machine learning techniques directly (without the data cleaning step) does not lead to useful or meaningful models. In electrical utility applications, these data can be extremely raw: data can come from diverse sources throughout the company, with different schemes for recording times for events or identities of components, it may be incomplete or extremely noisy, it may contain large numbers of free-text documents (for example, trouble tickets). Data processing fully defines the interpretation of the data that will be used by the machine learning model, such as by processing the above-described examples of data inputs. This processing turns historical data from diverse sources into useable predictive features and labels for learning. Data cleaning can include many steps such as pattern matching (for instance, finding regular expressions in structured or unstructured data), information extraction, text normalization, using overlapping data to find inconsistencies, and inferring related or duplicated records. Preliminary statistics can be used to assess whether data is missing, and for sanity checks on inferential joins.

An inferential join is the process by which multiple raw data tables can be united into one database based on at least one inference. Inferential joins can be a key piece of data cleaning. An example to illustrate the logic behind using basic pattern matching and statistics for inferential joining is the uniting of the main cable records to the raw manhole data for the manhole event process in NYC, to determine which cables enter into which manholes. Main cables connect two manholes (as oppose to service or streetlight cables that enter only one manhole). The cable data can come from a utilities' accounting department, which is different from the source of the manhole location data. A raw join of manholes to cables (based on a unique manhole identifier that is the union of 3 fields manhole type, number, and local 3-block code) yields a match to only about half of the cable records. The first round of corrections made to the cable data include spelling normalization and finding matches to neighboring 3-block codes (the neighboring 3-block code is often mistakenly entered for manholes on a border). The next round of corrections uses the fact that main cables have limited length: if only one of the two ends of the cable is uniquely matched to a manhole, with several possible manholes for the other end, the closest manhole is selected (the shortest possible cable length). This processing yields a match to about three quarters of the cable records. However, histograms of the cable length indicate that about 5% of these joined records represent cables that are too long to be real. Those cables can be used to troubleshoot the join again. Statistics can generally assist in finding pockets of data that are not joined properly to other relevant data.

Data can be: static (representing the topology of the network, such as number of cables, connectivity), semi-dynamic (occasionally, or topologically when a section is removed or replaced—almost forever), and dynamic (real-time, with timestamps). The dynamic data can be measured electronically (e.g., feeder loading measurements), or it can be measured as failures occur (e.g., trouble tickets). For the semi-dynamic and dynamic data, a timescale of aggregation can be chosen for the features and labels for machine learning. The data can be structured text or categorical data, numerical data, or unstructured text documents.

For all four applications described above, machine learning models can be formed, trained, and cross-validated on past data, and evaluated in an evaluation engine via, for example, "blind test" on more recent data using either a ranking or MTBF measurement. The formation of the features and labels for machine learning and the machine learning algorithms are discussed below.

The evaluation engine often produces changes to the initial processing. These corrections can be important for ranking problems. In ranking problems where the top of the list is often the most important, there is a possibility that top of the list will be populated completely by outliers that are caused by incorrect or incomplete data processing, and thus the whole list is completely useless. This happens particularly when the inferential joins are noisy; if a feeder is incorrectly linked to a few extra failure events, it will seem as if this feeder is particularly vulnerable. On the other hand, it is possible to troubleshoot this kind of outlier by performing case studies of the components on the top of the ranked lists.

For ranking algorithms, evaluation is usually performed using rank statistics, and ranked lists can be visualized as, for example, ROC (Receiver Operator Characteristic) curves. Sample evaluation metrics can include:
Percent of successes in the top k %: the percent of components that failed within the top k % of the ranked list.

AUC or weighted AUC: Area under the ROC curve, or Wilcoxon Mann Whitney U statistic, as formulated below. The AUC is related to the sum of misranked pairs in the list. Weighted AUC metrics (for instance, as used the P-Norm Push algorithm discussed below) are more useful when the top of the list is the most important.

MTBF and MTTF can be evaluated directly.

Machine Learning Methods for Ranking in a Rare Event Prediction Framework

The subfield of ranking in machine learning has expanded rapidly over the past few years as the information retrieval (IR) community has started developing and using these methods extensively (see the LETOR website and references therein). "Learning to Rank" has recently been identified as one of Yahoo!'s key scientific challenges in machine learning. Ranking algorithms can easily be used for applications beyond information retrieval; our interest is in developing and applying ranking algorithms to rank electrical grid components. In IR, the goal is to rank a set of documents in order of relevance to a given query. For both electrical component ranking and IR, the top of the list is considered to be the most important.

The ranking problems considered here fall under the general category of supervised learning problems. In supervised learning, the goal is to construct a function $f$ from a given data set (called the "training set"). The training set can be assumed to be drawn randomly from an unknown probability distribution, and consists of a set of objects, each of which are represented by a vector of features (i.e., attributes), and a label (i.e., desired output). The goal is to construct a function that predicts the label for a new object drawn from the same distribution. For a given learning problem, a loss function $R(f, \text{data})$, or quality metric, for the function can be defined. This quality metric can be a misranking loss, regression loss (as used in MTBF), misclassification loss, etc., depending on the goal. The function $f$ is often constructed via "empirical risk minimization," where $f$ is chosen by optimizing R for the training set, for instance:

$$f^* = \min_{f \in F} R(f, \text{training set})$$

In order to avoid overfitting in high dimensions, the class of functions F is the set of linear combinations of features.

Since the algorithm optimizes only the evaluation criteria R(f, training data), these models are not dual-purpose. The ranking models will not necessarily be as accurate at MTBF predictions when evaluated on MTBF criteria (and vice versa). In what follows, machine learning algorithms and evaluation criteria are disclosed for batch supervised ranking. Feeder failure rankings, the cable, joints, and hammerheads rankings, and the manhole events rankings can be constructed via batch supervised machine learning algorithms.

It is important to note that the specific choice of machine learning algorithm is not necessarily the major component of success in this domain; rather, the key to success can be the data cleaning and processing, as discussed above. If the machine learning features and labels are well constructed, any reasonable algorithm will perform well; the opposite holds too, in that badly constructed features and labels will not yield a useful model regardless of the choice of algorithm.

In supervised bipartite ranking tasks, the goal is to rank a set of randomly drawn examples according to the probability of possessing a particular attribute. The scoring function is constructed from a training set drawn from the same (unknown) distribution. Formally, the training set consists of examples with labels:

$$\{(x_i, y_i)\}_{i=1}^m, x_i \in \chi, y_i \in \{-1, +1\}$$

where each example is characterized by a vector of feature values:

$$\{h_j(x)\}_{j=1 \ldots n}, h_j: \chi \to R$$

In this case, the examples are electrical components, and the attribute one wants to predict is whether a failure will occur within a given time interval. The features encode the past performance, manufacturer, etc, of the components. For instance, x is a hammerhead, and $h_j(x)$ is 1 if the hammerhead is less than 10 years old, $h_j(x)$ is 0 otherwise. The scoring function is chosen to be a linear combination of the features:

$$f_\lambda(x) = \sum_j \lambda_j h_j(x)$$

The goal of the ranking task is to minimize a statistic of the ranked list computed on the full (unknown) distribution that the examples are drawn from. That unknown distribution represents the full set of possibilities for the feature values (e.g., the class of possible hammerheads). One possible goal is to minimize the probability that a new pair of randomly chosen examples is misranked:

$$P_D\{misrank_{f\lambda}\}$$

$$:= P_D\{f_\lambda(x_+) \le f_\lambda(x_-) | y_+ = 1, y_- = -1\}$$

The notation $P_D$ indicates the probability with respect to a random draw of $(x_+, y_+)$ and $(x_-, y_-)$ from distribution D on $X \times \{-1, +1\}$. For instance, this is the probability that a hammerhead that did not fail will be mistakenly ranked as being more vulnerable than a hammerhead that failed. Since the distribution D is unknown, one can construct the scoring function using risk minimization, where the misranking error is minimized on the training set, and the hope is that the solution will generalize to the full distribution. Probabilistic generalization bounds are used to theoretically justify this type of approach. The empirical risk corresponding to (1) is the number of misranked pairs in the training set:

$$R_1(f_\lambda) := \sum_{\{k: y_k = -1\}} \sum_{\{i: y_i = 1\}} 1_{[f_\lambda(x_i) \le f_\lambda(x_k)]}$$

$$= \#misfranks(f_\lambda)$$

The pairwise misranking error is directly related to the (negative of the) area under the ROC curve, or equivalently, the Wilcoxon-Mann-Whitney U statistic; the only difference is that ties are counted as misranks in the definition above. A natural algorithm is to use the minimizer of $R_1$ with respect to $\lambda$ as the scoring function.

There are three potential shortcomings to this algorithm: first, it is NP hard to minimize $R_1(f\lambda)$ directly. Second, the misranking error $R_1(f\lambda)$ considers all misranks equally, in the sense that misranks at the top of the list are counted equally with misranks towards the bottom, even though in failure prediction problems it is clear that misranks at the top of the list should be considered more important. A third shortcoming is the lack of regularization usually imposed to enable generalization (prediction ability) in high dimensions. A remedy for all of these problems is to use special cases of the following general formulation for the ranking objective that do not fall into any of the traps listed above:

$$R_\ell(f_\lambda) := \sum_{\{k: y_k = -1\}} g\left(\sum_{\{i: y_s = 1\}} \ell(f_\lambda(x_i) - f_\lambda(x_k))\right) + C\|f_\lambda\|$$

where g is called the price function and l is called the loss function. $R_1(f\lambda)$ is a special case of $Rl(f\lambda)$ with $l(z) = 1_{z \le 0}$ and $g(z) = z$. Alternatively, the objective is convex in $\lambda$ when the exponential loss is used $l(z) = e^{-z}$, or the SVM (support vector machine) hinge loss $l(z) = (1-z)_+$; several other convex loss functions can also be used. The norm used in the regularization term is generally either a norm in a Reproducing Kernel Hilbert space (for SVMs), which in the simplest case is $\|\lambda\|_2 = \Sigma_j \lambda_j^2$, or an $L_1$ norm $\|\lambda\|_1 = \Sigma_j |\lambda_j|$. The constant C can be set by cross-validation.

Special cases of the objective (2) are: SVM Rank which uses the hinge loss, $g(z) = z$ as the price function, and Reproducing Kernel Hilbert space regularization; RankBoost, which uses the exponential loss and no regularization; and the P-Norm Push. The P-Norm Push uses price function $g(z) = z^p$, which forces the value of the objective to be determined mainly by the highest ranked negative examples when p is large; the power p acts as a soft max. Since most of the "power" of the objective is then in the top portion of the list, the algorithm concentrates more on the top. The full P-Norm Push algorithm is:

$$\lambda^* \in \inf_\lambda \sum_{\{k: y_k = -1\}} \left(\sum_{\{i: y_i = 1\}} \exp(-[f_\lambda(x_i) - f_\lambda(x_k)])\right)^p$$

The vector $\lambda^*$ is not difficult to compute, for instance by gradient descent. On the test set, scores are computed as:

$$f(x) = \sum_j \lambda_j^* h_j(x)$$

and examples are rank-ordered by the score.

In one embodiment, the P-Norm Push is used when the component being analyzed is a manhole (e.g. as a manhole event prediction tool.) As an alternative embodiment, an SVM algorithm with $L_2$ regularization can be used as a feeder failure tool, i.e. when the component being analyzed is a feeder.

For batch supervised ranking methods, failure prediction is performed in a rare event prediction framework, meaning the goal is to predict events within a given "prediction interval" using data prior to that interval. The choice of prediction interval determines the labels for the machine learning problem. Specifically, $y_i$ is +1 if component i failed during the prediction period and −1 otherwise. The features are derived from the time period prior to the prediction interval.

Figure 6:
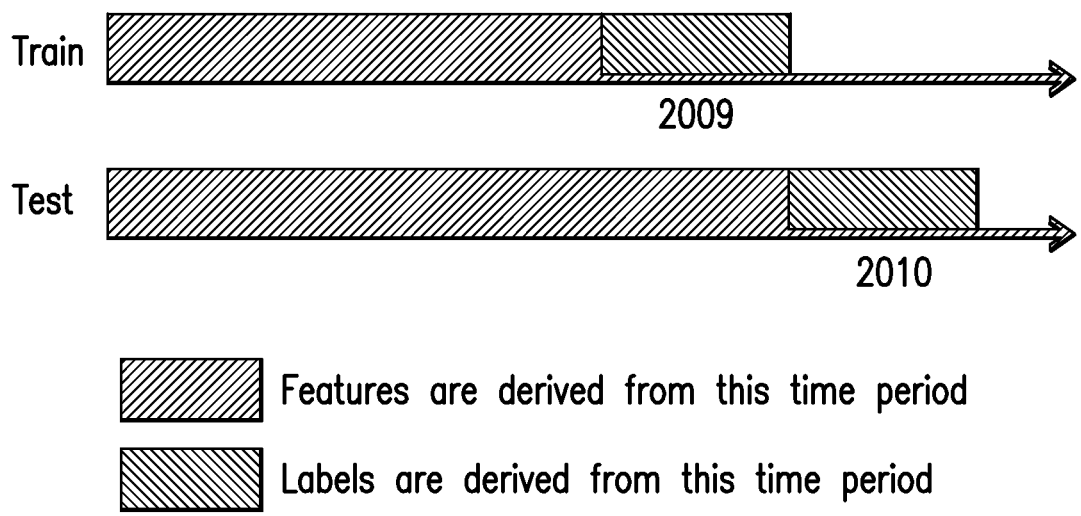
FIG. 6 is a sample timeline for a rare event prediction.

For instance, as shown in FIG. 6, if the goal is to rank components for vulnerability with respect to 2010, the model is trained on features derived from prior to 2009 and labels derived from 2009. The features for testing are derived from pre-2010 data. The choice of the length of the prediction interval is application dependent; if the interval is too small, prediction can be extremely difficult. If the length is too large, the predictions may be too coarse to be useful. For manhole event prediction in NYC, this time period as chosen to be 1 year as shown in FIG. 6, although additional time periods can be selected by one or ordinary skill in the art.

Time aggregation is performed using the method of FIG. 6 for manhole event prediction. A more elaborate time aggregation scheme is discussed in connection with feeder failure ranking, where "time shifted" features are used. These principles apply with equal force to all other applications discussed herein, including manhole rankings.

MTBF can be estimated indirectly through failure rates; the failure rate is converted to MTBF by taking the reciprocal of the predicted rate. Failure rate is estimated rather than MTBF for numerical reasons: good feeders with no failures have an infinite MTBF. The failure rate can be estimated by regression algorithms, for instance SVM-R (support vector machine regression), CART (Classification and Regression Trees), ensemble based techniques such as Random Forests, and statistical methods, e.g. Cox Proportional Hazards.

Specific Processes and Challenges

The general process can be adapted in order to handle data processing and machine learning challenges specific to each electrical reliability task. The challenges of feeder ranking and specifics of the feeder failure ranking process developed for Con Edison (also called "Outage Derived Data Sets—ODDS"), according to one specific, non-limiting embodiment is disclosed. Data processing challenges for cables, joints and hammerheads is then disclosed as another illustrative embodiment. The manhole event prediction process is next disclosed, and finally, the MTBF estimation process is disclosed as other specific, non-limiting embodiments.

Feeder Failure Ranking

For the feeder ranking task, the features can be derived in one specific embodiment, from: physical characteristics of the feeder, including characteristics of the underlying components that compose the feeder; electrical characteristics, obtained from electric load flow simulations; and dynamic data, from real-time telemetry attached to the feeder. Some additional features can be computed from formulas developed by domain experts.

Con Edison data regarding the physical composition of feeders can be noisy; errors in the database entry and rewiring of components from one feeder to another can make it difficult to get a perfect snapshot of the current state of the system. Further, one must handle component aggregation: a typical feeder is composed of over a hundred cable sections, connected by a similar number of joints, and terminating in a few tens of transformers. For a single feeder, these subcomponents can be a hodgepodge of types and ages, e.g., a brand new cable section may be connected to one that is many decades old. One can take a number of approaches to solve this "roll-up" problem, including looking at maxima, averages, $90^{th}$ percentile (similar to max, but avoids outliers), and electrical characteristics (e.g., how much current a feeder is expected to carry under various network conditions). The electrical characteristics are imprecise, as the electric load-flow simulations that generate them rely on the correctness of a given system model.

Dynamic data presents a similar problem to physical data, but here the challenge can be aggregation in time instead of space. Telemetry data is collected at rates varying from hundreds of times per second (for power quality data) to only a few measurements per day (weather data). These can be aggregated over time, again using functions such as max or average, using different time windows. Some of the time windows are relatively simple (e.g., aggregating over 15 or 45 days), while others take advantage of the system's periodicity (see FIG. 7), and aggregate over the most recent data plus data from the same time of year in previous year(s).

One of the challenges of the feeder ranking application is that of imbalanced data/scarcity of data characterizing the failure class can cause problems with generalization. Specifically, primary distribution feeders are susceptible to different kinds of failures, and one can have very few training examples for each kind of event, making it difficult to reliably extract statistical regularities or determine the features that affect reliability. For instance, failure can be due to emergency isolation caused by automatic substation relays (Open Autos or OA), shut-down of other feeders in the network, for instance for maintenance or inspections, aging, power quality events (e.g., spikes), overloads (that have seasonal variation, with summer heat waves especially problematic), known weak components (e.g., PILC cable and joints connecting PILC to other sections), at risk topologies (where cascading failures could occur), workmanship problems, the stress of "HiPot" (high potential) testing, and de-energizing/reenergizing of feeders that can result in multiple failures within a short time span called "infant mortality." Other data scarcity problems are caused by the range in lifespan of the feeders; while some feeders are relatively new and last for a very long time (for example, more than 5 years), others can be short-lived (failures within a few days of each other). In addition, rare seasonal effects (such as high summer temperatures) can affect failure rates of feeders. Thus there is considerable imbalance in the training data making generalization difficult. Solutions to these potential problems are discussed below.

Figure 7:
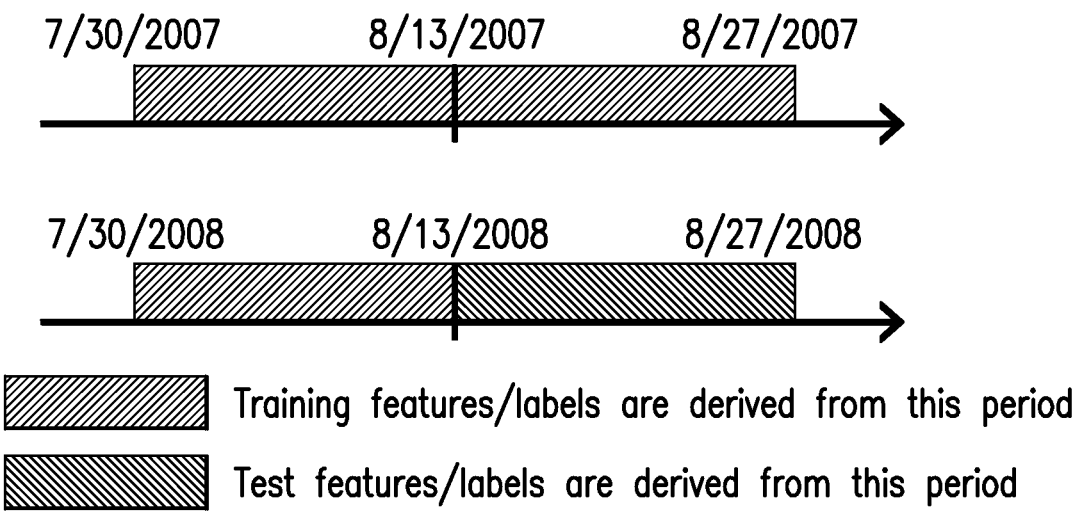
FIG. 7 illustrates an example illustrating the training and test time windows in an Outage Derived Data Set (ODDS). In this example, the current time is taken as Aug. 13, 2008 and the failure data for training is derived from Jul. 30, 2007 to Aug. 27, 2007 and Jul. 30, 2008-Aug. 13, 2008.

In one particular embodiment, the focus is on most serious failure type, where the entire feeder is automatically taken offline by emergency substation relays, due to some type of fault being detected by sensors. The presently disclosed system for generating data sets can address the challenge of learning with rare positive examples (feeder failures). An actual feeder failure incident is instantaneous: a snapshot of the system at that moment will have only one failure example. To better balance the data, one can employ the rare event prediction setup shown in FIG. 6, labeling any example that had experienced a failure over some time window as positive. However, the dynamic features for these examples are constructed from the timeframe before the prediction period, and thus do not represent the precise conditions at the time of failure. This can be a problem, as some of the dynamic data might only have predictive value in the period right before the failure. To solve this problem, one can switch to time-shifted positive examples: the positive examples are created from the past outages within the prediction period with dynamic features captured shortly before the failure happened. This allows the model to capture short-term precursors to failures. The class of non-failures (negative examples) can be computed using characteristics of the current snapshot of all feeders in the system. Not only does this approach, which is referred to herein as "ODDS" for Outage Derived Data Sets, capture the dynamic data from right before the failure, it helps to reduce the massive imbalance between positive and negative examples that naturally occurs in failure data. FIG. 7 shows an example of the periods used to train and test the model according to this specific embodiment.

Another challenge raised and addressed by the presently disclosed feeder failure ranking application was "concept drift," meaning that patterns of failure change fairly rapidly over time, so that a machine learning model generated on data from the past may not be completely representative of future failure patterns for current equipment. Features can become inactive or change in quality. Causes of this include: (1) repairs being made on components, causing the nature of future failures to change, (2) new equipment having different failure properties than current equipment, (3) seasonal variation in failure modes (e.g., a greater likelihood of feeder failure in the summer). To address this challenge, ODDS learns a new model in a regular basis in relatively short order (e.g., every 4 hours) on the current dataset.

Figure 8:
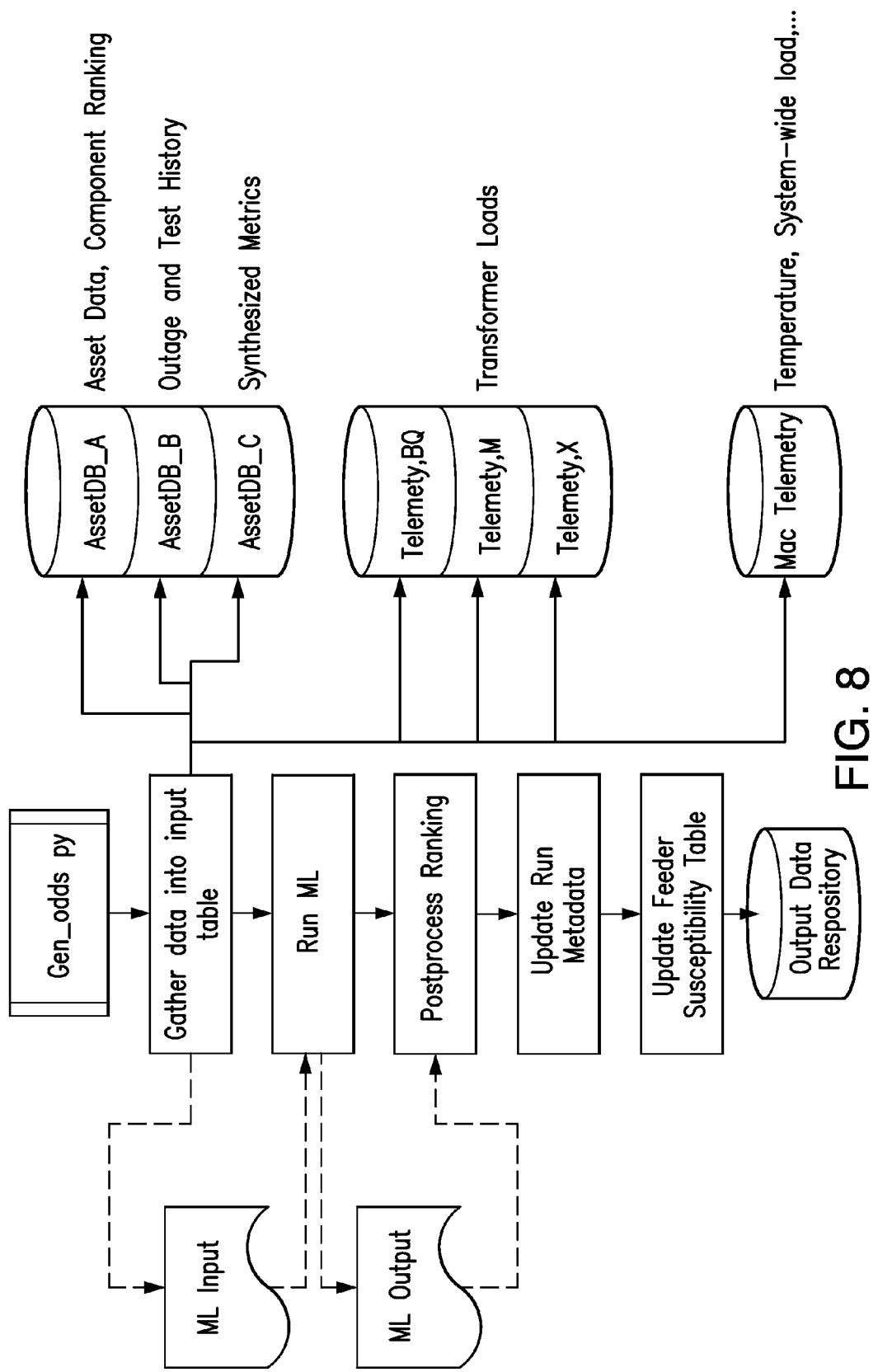
FIG. 8 is a flow diagram of an illustrative system and method example incorporating machine learning and ODDS.

A diagram of the overall system according to this specific embodiment is shown FIG. 8. A number of business management applications can use the data in the Output Data Repository to highlight areas of risk through graphical displays and map overlays.

As in many real-life applications, applications can be faced with the problem of missing data. Techniques such as mean-imputation can be used to fill in missing values.

Cables, Joints, Terminators, & Transformers Data Processing

The main challenges to constructing rankings of feeder components overlap somewhat with those faced in constructing rankings for feeders: the use of historical corporate data, and the data imbalance problem.

Ideally, one should be able to compose a consistent and complete set of features for each component and also the connectivity, environmental, and operational contexts it lived in at the time of failure. Recreating these contexts in an exact way can be impossible with the available data. At Con Edison, the cable data used for cable, joint, and terminator rankings resides in the "Vision Mapping" system and was designed to only represent the current layout of cables in the system, and not to provide the layout at particular times in the past. Data archival efforts were initiated, and also relied on other snapshots of cable data made available by the utility, for example, cable data captured for the Con Edison Network Reliability Indicator program.

Generating training data for joints in New York City was especially challenging. Joints are the weakest link in feeders with certain heat-sensitive joint types having accelerated failure rates during heat waves. Con Edison keeps a database of feeder component failures called CAJAC. It captures failure data of joints in detail. Con Edison autopsies failed components and the failure reasons discovered are captured in this database. Though the joint failure data is recorded in detail, there is sometimes no complete list of the set of installed joints within the grid. The set of installed joints mainly has to be imputed from the connections between cables. Furthermore, short lengths of cable called inserts, used to make connections in manholes, are not captured in the Vision Mapping system, so the number of joints in any manhole can only be estimated in general. Also, for very old joints, the nature of the joint (type of joint, manufacturer, etc.) has had to be inferred from the date of installation. This can be done by assuming that the policy in force at the installation date was used for that joint, which allows us to infer the manufacturers and techniques used.

Several data sources were merged, using inferential joins, for creating a transformer database, including data from Con Edison's accounting department, inspection record database, and the dissolved gas database. Transformer ranking has several semantic challenges. There are a large number of different transformer designs and manufactures and the full set of transformer classes may only be known by experts at the local utility and never transferred for use in predictive, machine learning applications. Also, it is noted that the transformer population was actively monitored and aggressively replaced by Con Edison, meaning that transformers that had not failed may have been replaced anyway, leading to right censoring (meaning missing information after a certain time in the life of the transformer). Further, since transformers were sometimes replaced prior to failure, it was a challenge to determine when failures occurred, and incorrect assignment of failures caused label bias for machine learning.

Components that have multiple roles or act as interfaces between multiple types of components, such as terminators, present the challenge of bringing together multiple databases to capture the full context for the component. In order to rank hammerheads (which are a type of terminator of cables to transformers) a database was built that joined splice ticket data, cable data, and transformer data, where transformer data itself came from an earlier join of large databases.

Not all datasets use the same convention for recording dates; in some cases, the date entry represents a date when work was done, in other cases, the date is a data-entry date. In some instances there were timing confusions based on whether time was provided in GMT, EDST or EDT, leading to some cases where the machine learning systems made perfect predictions, but for the wrong reasons: they learned to detect inevitable outcomes of failures, but where these outcomes apparently predated the outages because of data timing skew.

Manhole Event Ranking

Figure 9:
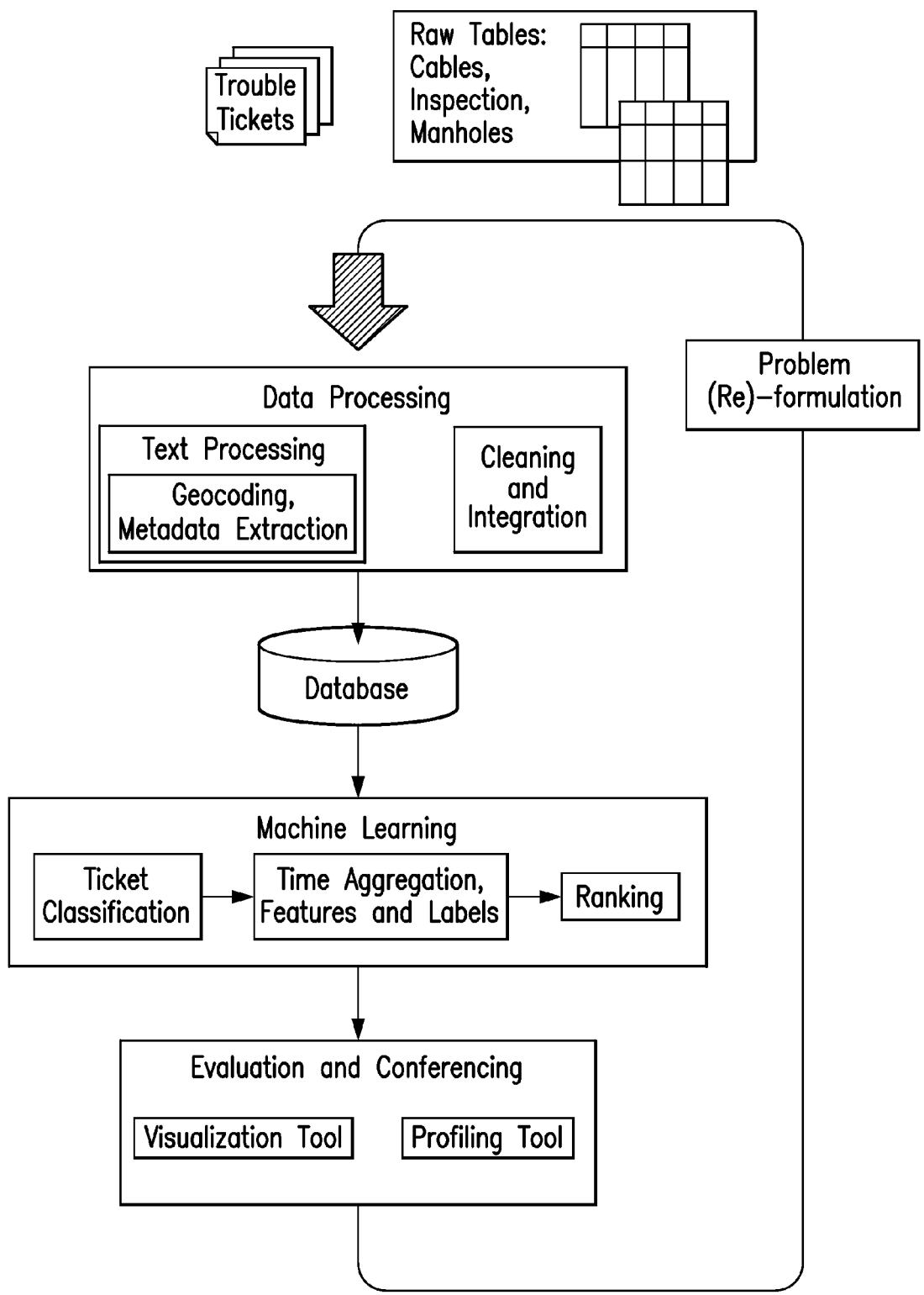
FIG. 9 is a flow diagram of a illustrative system and method example incorporating trouble tickets for purposes of ranking manholes propensity to failure, i.e., a manhole event ranking.

One major challenge for manhole event prediction was to determine which of many data sources, and which fields within these sources, to trust. The data used for the manhole event prediction process includes: information about the infrastructure, namely a table of manhole locations and information, and a snapshot of recent cable data from Con Edison's accounting department (type of cable, manholes at either end of cable, installation dates); five years of inspection reports filled out by inspectors; and most importantly, event data. The event data came from several different sources: ECS (Emergency Control Systems) trouble tickets which included both structured fields and unstructured text, a table of structured data regarding manhole events (called ELIN—ELectrical INcidents), and a third table regarding electrical shock and energized equipment events (called ESR/ENE). These data were the input for the manhole event prediction process outlined in FIG. 9.

The trouble tickets can be unstructured text documents, so a representation of the ticket had to be defined for the learning problem. This representation can encode information about the time, location, and nature (degree of seriousness) of the event. The timestamps on the ticket can be directly used, but the location and seriousness must be inferred (and/or learned), as described below.

The locations of events were inferred using several sources of location information present in the trouble tickets, including a street address (e.g., 325 GREENWHICH ST), structure names typed within the text of the ticket (S/B 153267) and structure names sometimes included in the structured fields of three tables (the ticket front, ELIN or ESR/ENE). All location information was typed by hand, and these data were very noisy—for instance, the term "service box" was written in at least 38 different ways—and no one source of information was complete. The redundancy in the data was used in order to obtain reliable location data: structure numbers were extracted from the ticket text using information extraction techniques (see FIG. 10). Then tickets were geocoded to determine approximate location of the event. If the geocoded address was not within a short distance (200 m) of the structure named within the ticket, the information was discarded. The remaining (twice verified) matches are used, so the ticket was identified correctly with the manholes that were involved in the event.

It was necessary also to determine the seriousness of events; however ECS trouble tickets were not designed to contain a description of the event itself, and there is no structured field to encode the seriousness directly; on the other hand, the tickets do have a "trouble type" field, which is designed to encode the nature of the event (e.g., underground AC event "UAC," flickering lights "FLT," etc). Originally, the trouble type was used to characterize the seriousness of the event: the codes "MHX" (manhole explosion), "MHF" (manhole fire), and "SMH" (smoking manhole) were used to identify serious events. However, a study was later performed that showed that the trouble type did not agree with experts' labeling of tickets, and is not a good measure of seriousness. In order to better estimate the seriousness of events, a representation of each ticket was created based on information extracted from the ticket text, including the length of the ticket, the presence of serious metadata (for instance, the term "SMOKING LIGHTLY"), and whether cable sizes appeared in the text (indicating the replacement of a cable). This information extraction was performed semiautomatically using text-processing tools, including the Generalized Architecture for Text Engineering "GATE".

The ticket representation was used to classify the tickets into the categories: serious events, possible precursor events, and non-events. This classification was performed with either a manual, rule-based method or general machine learning clustering methods (k-means clustering). In this embodiment, there were two machine learning steps in the manhole event ranking process: a ticket classification step, and a manhole ranking step.

One challenge faced early on was in choosing the timeframes for the rare event prediction framework. Originally it was tried to predict manhole events on a short timescale (on the order of 60 days) based on the domain experts' intuition that such a timescale would yield a useful predictive model. However, it became clear that manhole events could not easily be predicted over such a short time; for instance if it is known that a manhole event will occur within 60 days after a prior event, it is almost impossible to predict when within those 60 days it will happen. In fact, insulation breakdown, which causes manhole events, can be a slow process, taking place over months or years. Accordingly, a prediction period of one year was chosen for machine learning, as illustrated in FIG. 6.

The cable data, which is a snapshot at one (recent) point in time, was unified with the other data to construct "static" features and labels for the ranking task. This assumes implicitly that the snapshot approximately represents the number and type of cables over the time period of prediction. This assumption is necessary since the exact state of cables in the manhole at a given time in the past may not be available. However, this assumption is not universally true; for instance it is not true for neutral (non-current carrying, ground) cables at Con Edison, and neutral cable data thus cannot be used for failure prediction.

In this embodiment, the P-Norm Push (disclosed above) was used as the main ranking algorithm for manhole ranking.
MTBF Process It became apparent that to improve the value of the feeder work to proactive maintenance, one had to also produce estimates that allow for an absolute measure of vulnerability, rather than a relative (ranking) measure; as in other lean management efforts, many asset replacement decisions are made by assessing how much reliability in days is gained if a particular choice is made (for instance, to replace a set of PILC cables vs. another replacement at the same cost). Tools to analyze MTBF from data and to estimate it using statistical and machine learning models are described next according to one specific embodiment.

The fields of Reliability Engineering and statistical Survival Analysis provide techniques to model and relate failure rate to features of the component or system. One such technique is Cox's proportional hazards model. One can study relationships of covariates that could affect the failure rate in a multiplicative way. An alternative is the accelerated failure time model which assumes that the effect of a covariate is to multiply the predicted event time by some constant.

Figure 11:
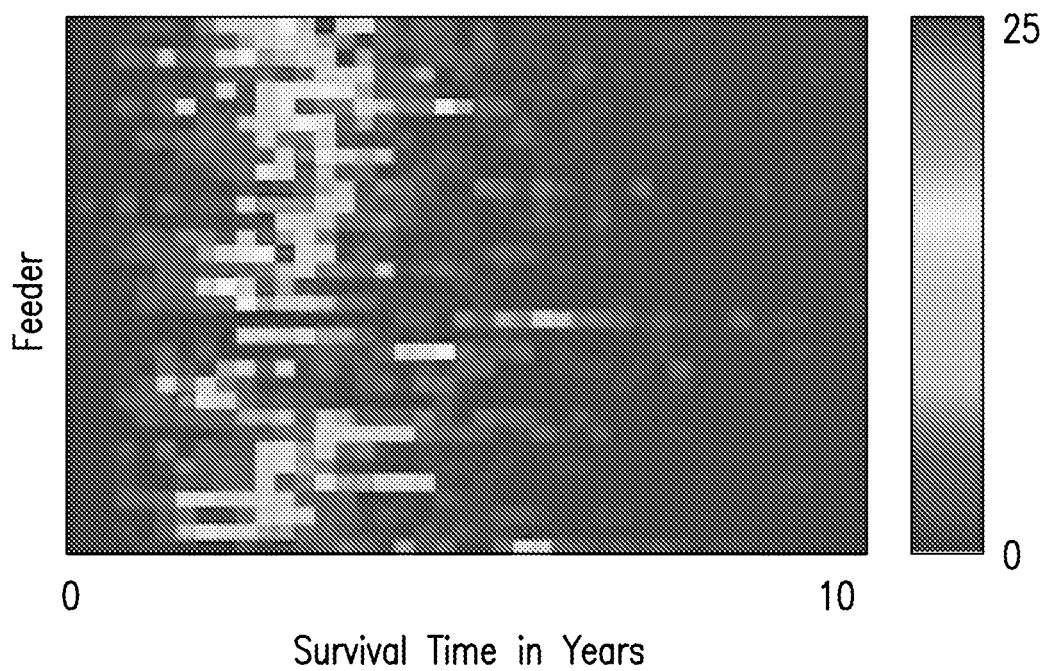
FIG. 11 is a depiction of Support Vector Classification-Regression (SVCR) prediction results on Paper Insulated Lead Covered (PILC) Cables of 33 feeders in Queens. Each row represents a feeder, and the horizontal axis is the survival time in years. The scale indicates the number of samples predicted to be within each analysis bin.

Machine learning techniques can be used to estimate MTBF from covariates as well. Several researchers have exploited the ability to handle censored data as ordering constraints in SVM regression. FIG. 11 shows the application of one of these techniques to predicting survival times of PILC cables in Queens. SVM regression was used to estimate MTBF from covariates for feeders. FIG. 11 is in the form of a SVCR prediction results, which is described in greater detail in "A Support Vector Approach to Censored Targets", Pannagadatta Shivaswamy, Wei Chu, Martin Jansche, Seventh IEEE International Conference on Data Mining (ICDM), 2007, pp. 655-660, which is hereby incorporated by reference in its entirety.
Evaluation in NYC The results of our specific processes as applied to the NYC power grid are described. Con Edison now operates the world's largest underground electric system, which delivers up to 14000 MW of electricity to over 3 million customers. A customer can be an entire office building or apartment complex in NYC so that up to 15 million people are served with electricity. Con Edison started keeping data records on the manufacturer, age, and maintenance history of components over a century ago, with an increased level of Supervisory Control and Data Acquisition (SCADA) accuracy added largely over the last 15 years. Performance statistics versus investment and maintenance costs of all components have been measured automatically since 2002.

Machine learning models have been generated for ranking the reliability of all 1000+ high voltage (13-27 KV) feeders that form the backbone of the NYC's power distribution system; and for each of the ~150,000 cable sections and ~150,000 joints that connect them; for the ~50,000 transformers and ~50,000 connectors that join the transformers to the feeders; and for ~150,000 secondary structures (manholes and service boxes) through which low voltage (120-240 V) power from the transformers is distributed to all buildings in NYC.
Feeder and Component Failure Evaluation The performance of the presently disclosed machine learning models can be tracked by checking the ranking of the failed feeder component whenever a failure happens. One can then compile real-time ROC curves that display both the components that failed (FIG. 12) and the feeder that automatically opened its circuit breaker when the failure occurred (FIG. 13). These blind tests can provide the validation that the algorithms are working sufficiently to use in operations decisions that affect the maintenance program of the utility.

The presently disclosed machine learning system for computing feeder susceptibility based on the ODDS system is online. The susceptibility rankings can be used in several business management applications. In one, hypothetical feeder repairs and improvements are evaluated against the model, in order to judge their potential effect on the feeder's susceptibility. The most beneficial maintenance actions are then passed on to the operations control centers. Another tool, that runs continuously, automatically evaluates what would be the worst possible next failure, i.e., what subsequent failure would put the system in the greatest risk? This application is now augmented with an ODDS susceptibility ranking to give an additional important input: what feeders most likely to fail next? Operators can now consider both estimated likelihood and estimated severity when determining what actions to take to alleviate stress on the system.

ODDS performance can be tracked in real time by recording the susceptibility rank from the model (running every 4 hours) at the time of each new OA (feeder failure). The ODDS system has the rankings from all component models run, including transformers, sections, joints, hammerheads, and manholes. In addition, ODDS is driven by the feeds from three dynamic real time systems: load pocket weight, power quality, and outage history. It was found that separate training in Brooklyn and Queens, with their 27 KV networks, and Manhattan and Bronx, with their 13 KV networks, produced better results.

Figure 12A:
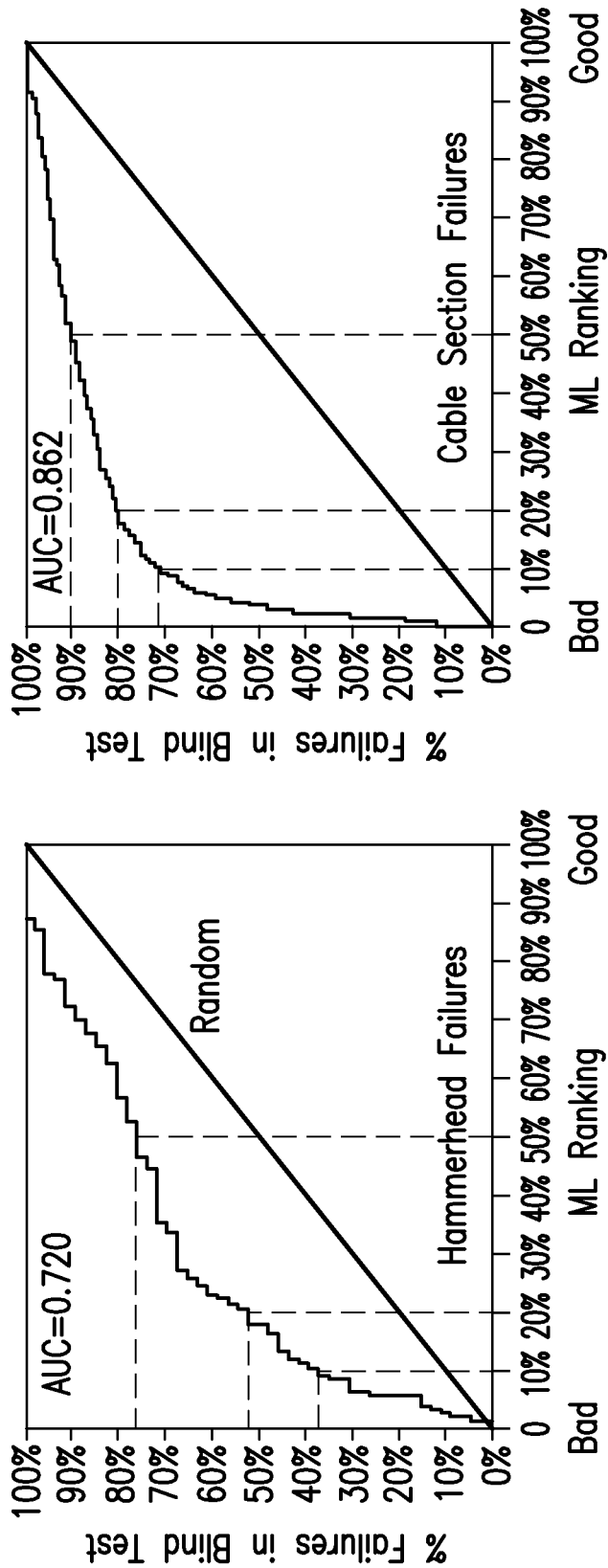
Figure 13:
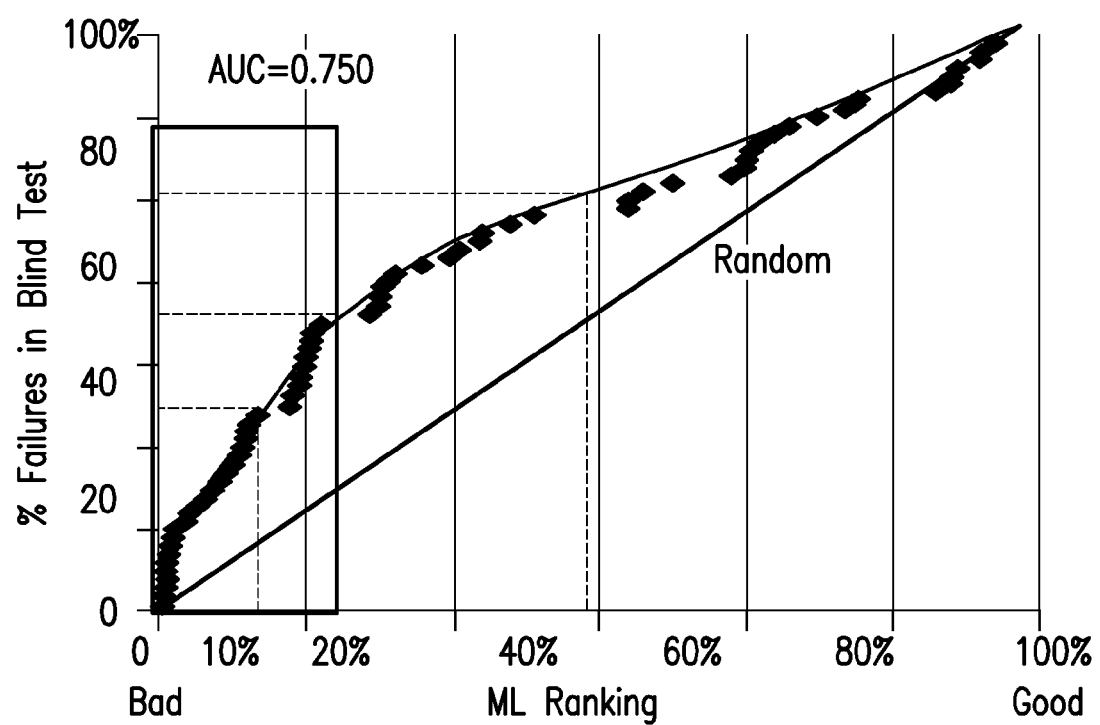
FIG. 13 is an example of ROC curve for Crown Heights feeders for May, 2008 through January, 2009.
Figure 14:
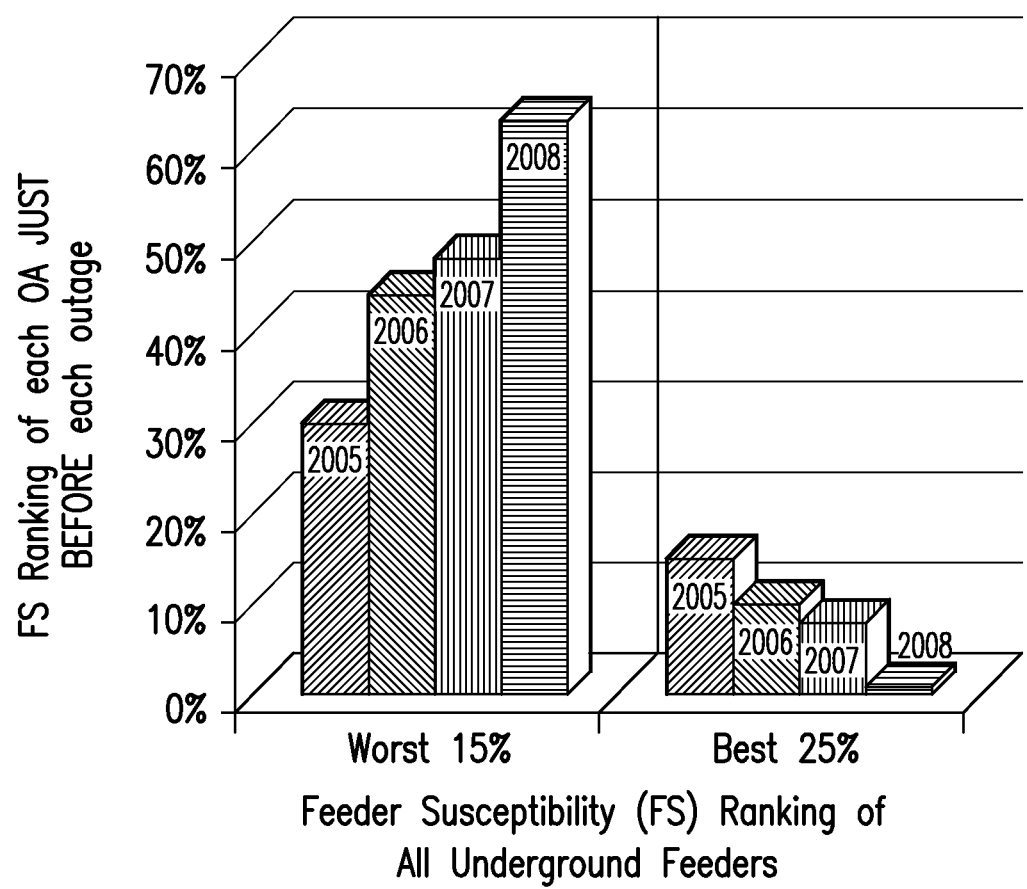
FIG. 14 depicts the improvement in machine learning performance in predicting the percentage of feeder failures that were in the worst 15% (left) and the best 25% (right) of Susceptibility rank at the time of each failure. The system improved from 20% of the failures in the worst 15% in 2005, to greater than 60% in 2008, for example.

One can use AUC for each network's ROC within each borough to measure performance of the ODDS system (FIG. 12). The machine learning system has improved to the point where 60% of failures occur in the 15% of feeders that ODDS ranks as most susceptible to failure. As importantly, fewer than 1% of failures occur on feeders in the best 25% of ODDS Feeder Susceptibility ranking (FIG. 14).

MTBF Evaluation

The improvement in Mean Time Between Failure was tracked for each network as preventive maintenance work has been done to improve performance since 2002. To test whether this improvement is significant, a statistical test was used, called the logrank test, that compares the survival distributions of two samples. In this case, it was desired to determine if the end point of a linear regression in yearly MTBF per network in 2009 was significantly improved from the beginning point of the regression in 2002. This assumes the 2002 network performance to be the control group. The results are summarized in FIG. 15.

Figure 15:
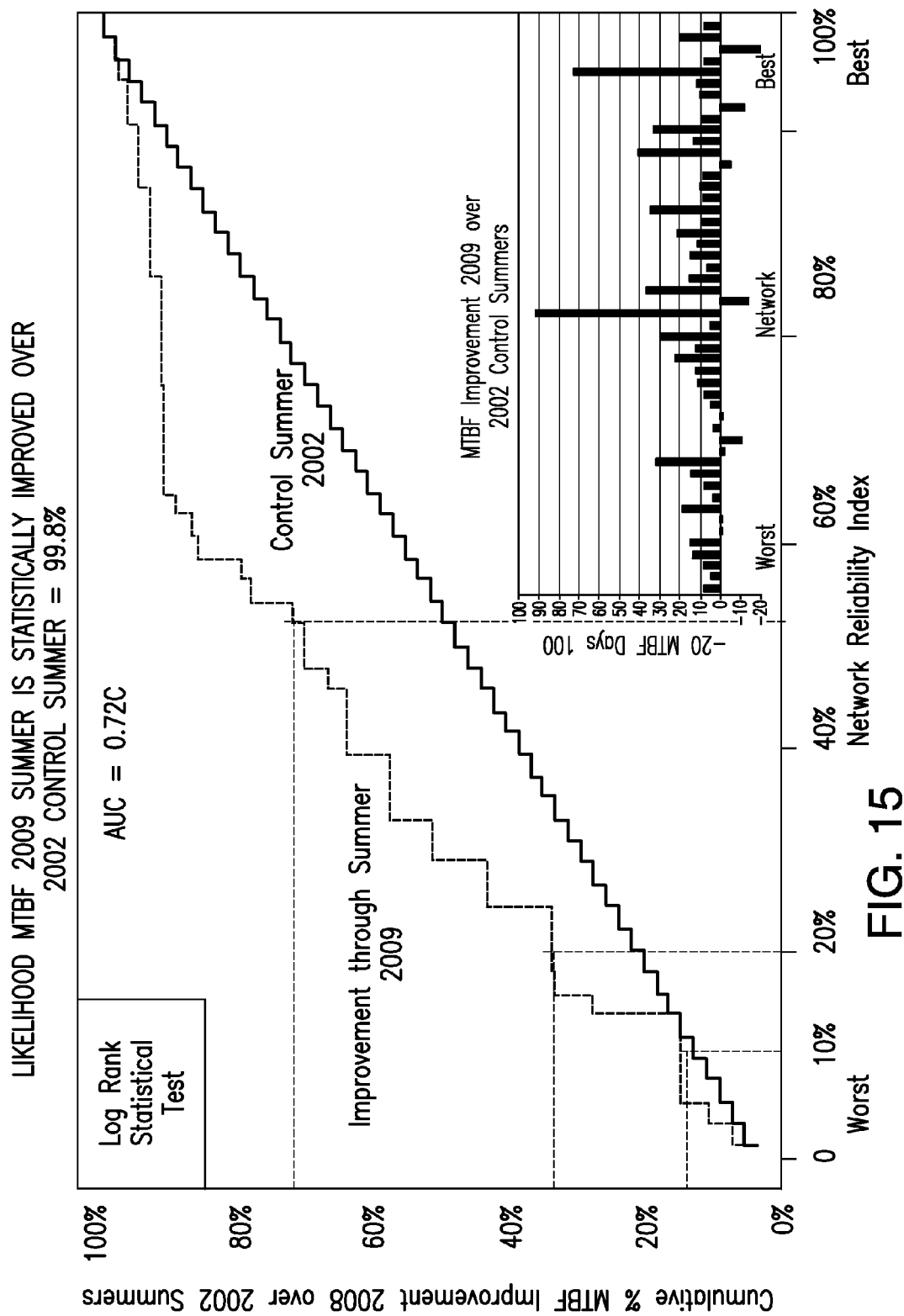
FIG. 15 is an illustration of logrank (Mantel-Cox) test. The cumulative percentage MTBF improvement between 2002 and 2009 is shown (dashed), as a function of the summer 2002 control group MTBF performance (solid). The test resulted in a 99.8% chance that the treatment group in 2009 improved over the control group from 2002 across all networks at Con Edison, from worst (left) to best (right) performing networks.
Figure 16A:
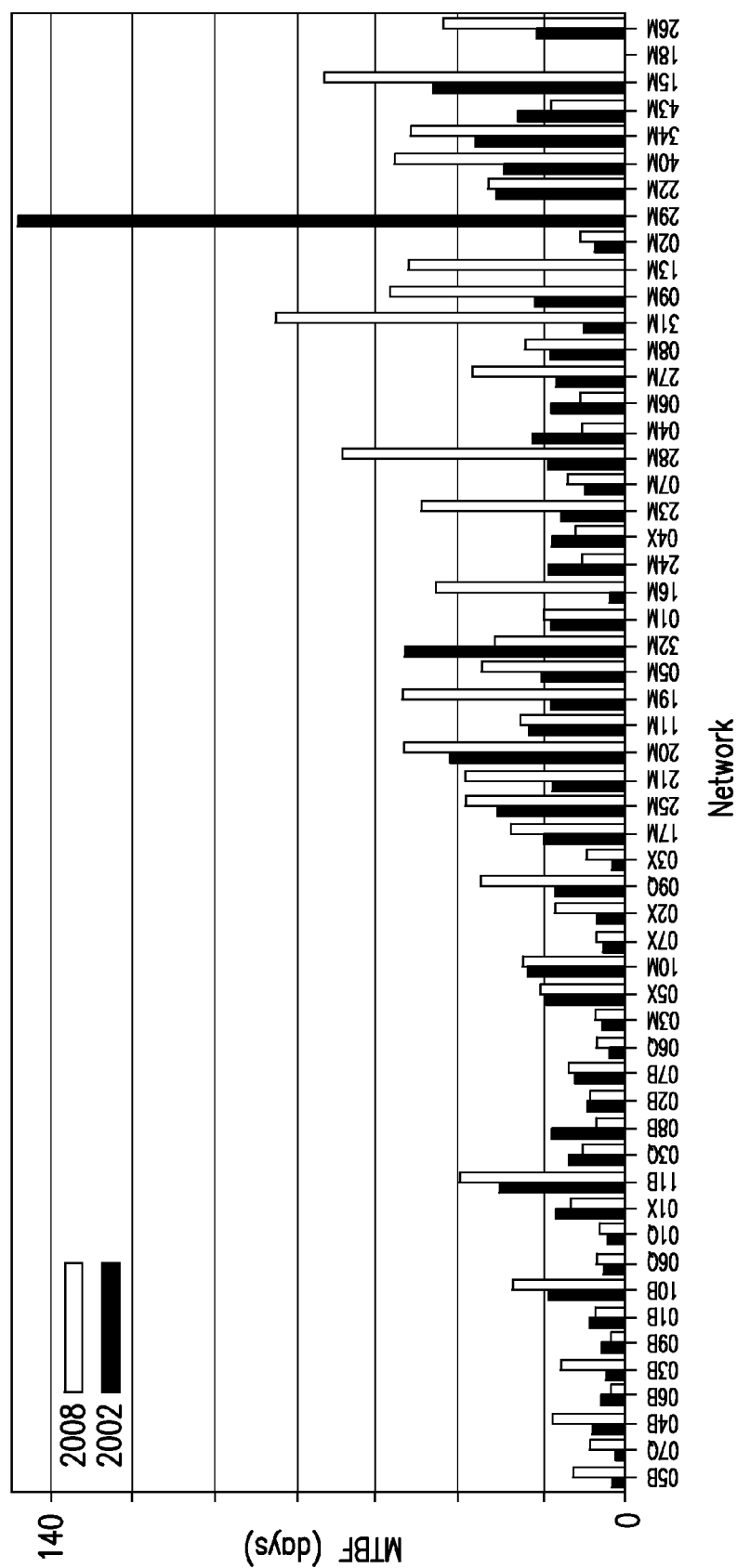
FIG. 16A-B is depicts how linear regression was used to determine the improvement in MTBF from 2002 to 2009 (top) and the difference between the initial 2002 control and 2009 MTBF (bottom) in every underground network in the Con Edison system, arranged from worst Network Reliability Index (left) to best (right) on the horizontal axis.
Figure 16B:
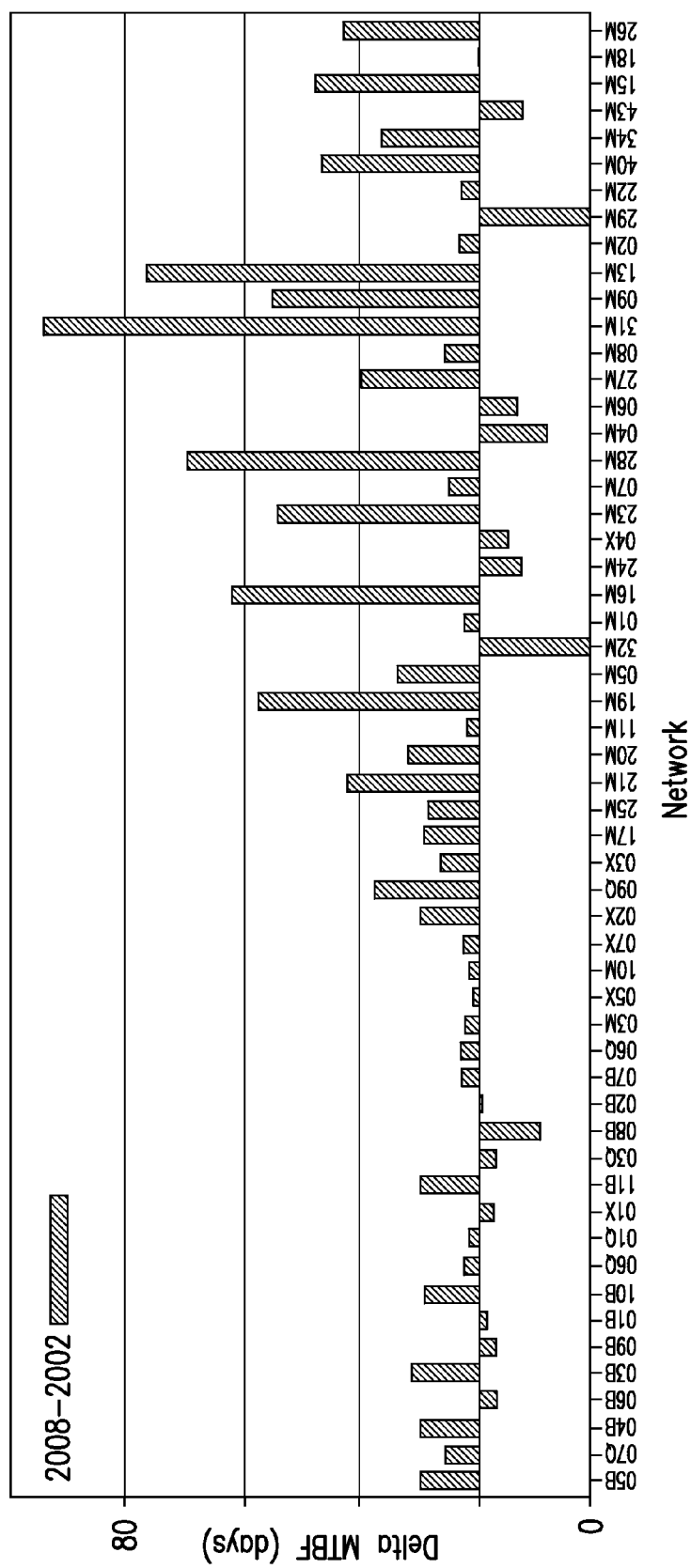

FIG. 15 shows an ROC-like curve for the sample and control groups. This curve was obtained by cumulatively subtracting the log of the survival time (MTBF) from worst to best (Con Edison's "Network Reliability Index" ranking in 2009 for that ranking of each network was used, with the feeders arranged on the horizontal axis from worst at the left to best at the right). The performance of the system showed a significant improvement, comparing the time period up to the summer of 2009 with the summer 2002 control group. In fact, there is a less than one in a billion chance that the treatment population in 2009 did not improve over the control population from 2002. The larger the separation between the cumulative percentage improvement in MTBF (dashed line) versus the 2002 control (solid), the higher the significance level of the result. In 2008, for example, there were 1468 out of 4590 network-days that were failure free, or one out of every three summer days, but in the 2002 control group, there were only 908 or one out of five summer days that were failure free. The larger the percentage of network-days that were failure free, the lower the likelihood of multiple contingencies, which also significantly improves the Network Reliability Index (FIG. 16).

Figure 17:
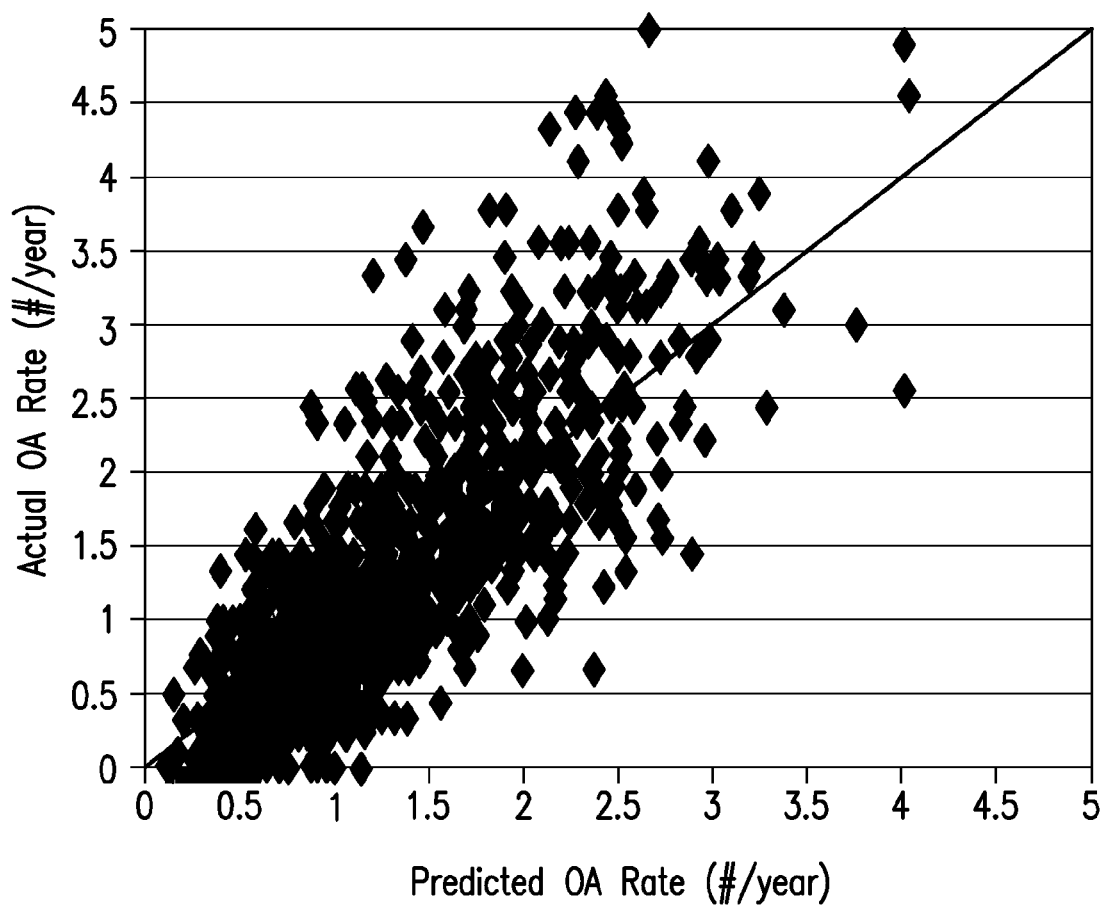
FIG. 17 is a plot of Support Vector Machine (SVM) predicted outage rate vs. actual for all classes of unplanned outages. The diagonal line depicts a perfect model. This was based on 3 years of outage data. There is a so-called right-censoring effect for the low outage rate feeders due to lack of failures in the 3-year observation window in the lower left of the plot. There is also an infant mortality process, leading to an underestimating of actual failures for the bad feeders (visible particularly in the upper right of the graph).

FIG. 17 demonstrates the accuracy of prediction of outage rates for all classes of unplanned outages over a three-year period for the feeder MTBF model. The results are clearly quite strong. Concepts of the study worthy of note: 1) Infant mortality. The study did not model infant mortality, i.e., the increased likelihood of failure after a repaired system is returned to service. Empirically it was observed that an increased likelihood of infant mortality for about six weeks. 2) Censored data. If events are very infrequent within a machine learning training sample, it is not possible to accurately train the learning system to accurately predict their frequency. For example, if there is only one failure during three years, neither of the two periods of time—from the beginning of data collection to the event, and from the event to the end of data collection—provides an accurate estimate of actual event frequency. The CAP and CAPT systems, described below, use an estimate of event frequency which is equal to the training period length divided by the number of events, a method that leads to better training data, and consequently more accurate estimates for "good" assets than what is shown in FIG. 17.

Manhole Event Ranking Evaluation:

The most recent evaluation of the manhole rankings was a blind test for predicting 2009 events in the Bronx. The database has data through 2007, incomplete 2008 data, and no data from 2009 or after. There are 27212 manholes in the Bronx. The blind test showed:

the most at-risk 10% (2721/27212) of the ranked list contained 44% (8/18) of the manholes that experienced a serious event, the most at-risk 20% (5442/27212) of the ranked list contained 55% (10/18) of the trouble holes for serious events.

Figure 18:
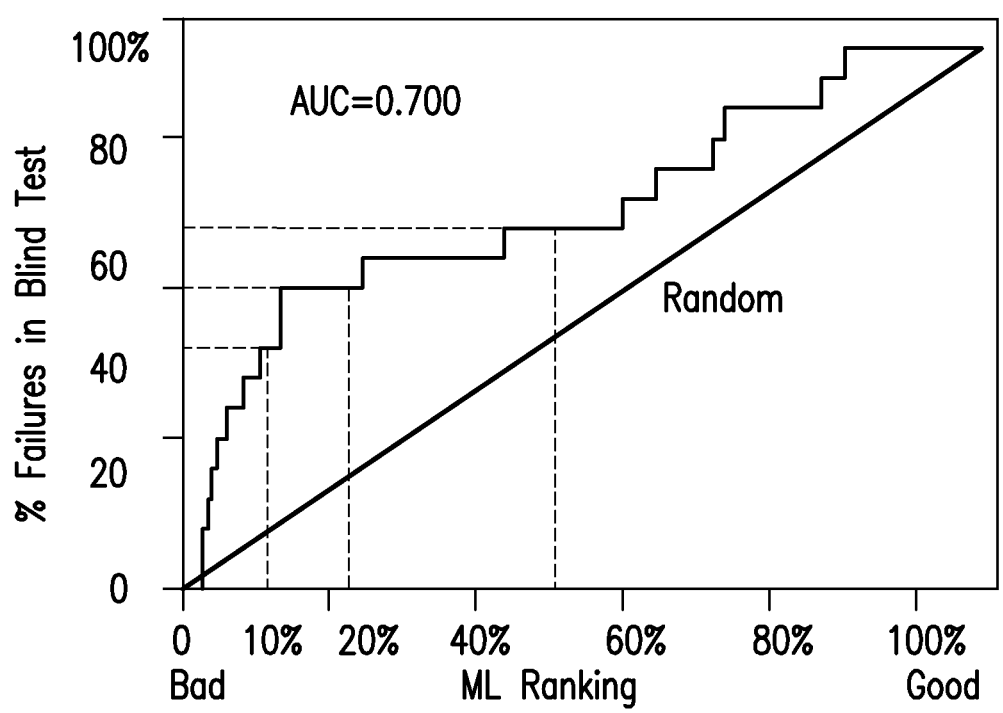
FIG. 18 depicts a ROC curve for 2009 Bronx blind test of the machine learning ranking for vulnerability of manholes to serious events (fires and explosions).
Figure 19:
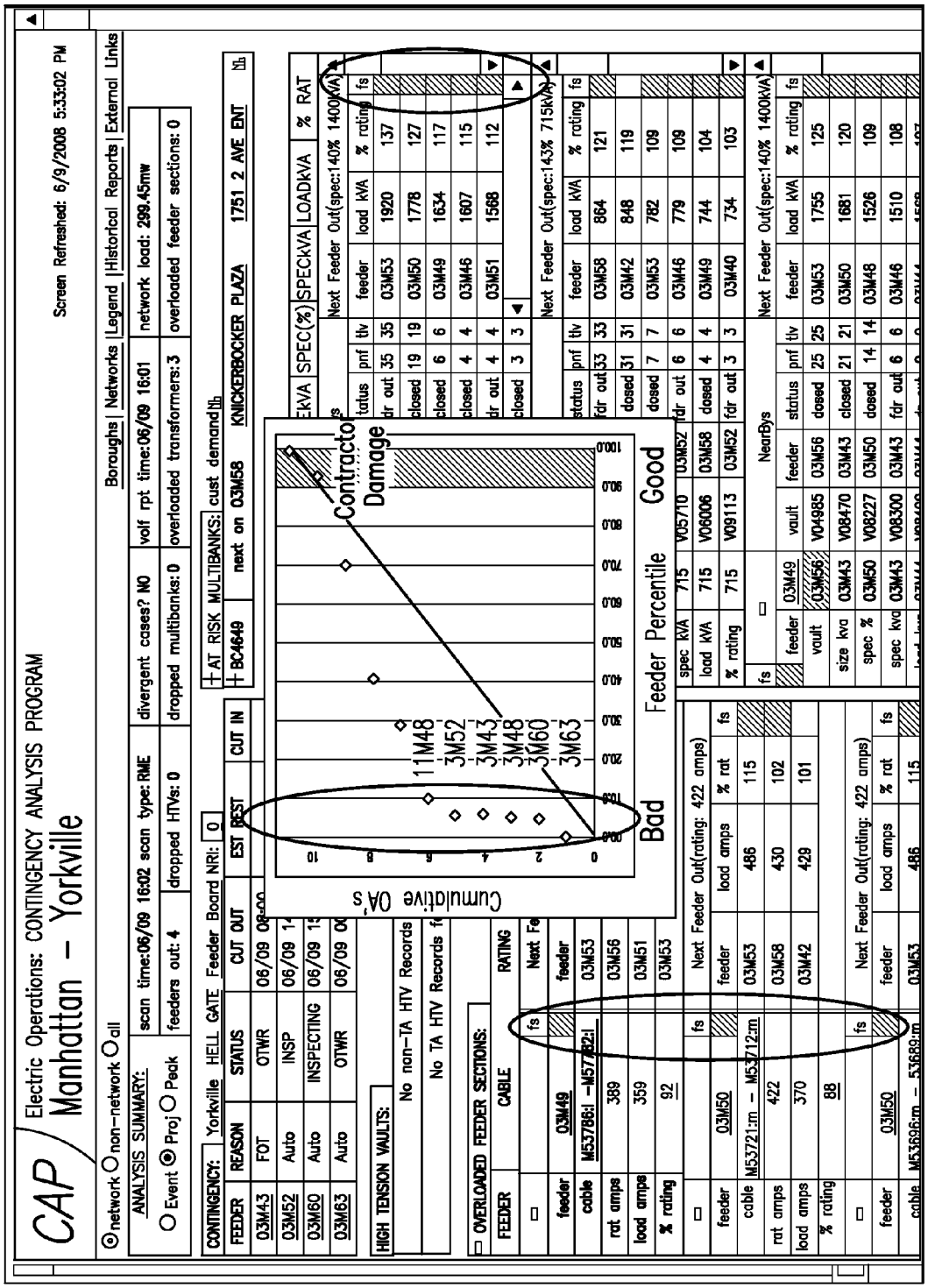
FIG. 19 is a screen capture of the Contingency Analysis Tool (CAP) during a 4th contingency event in the summer of 2008, with the next most likely feeders at most risk of failing next highlighted in red. ODDS ranking at the time of failure are shown in a blow-up ROC plot in the center. The Contingency Analysis Tool is an example of a decision support application.
Figure 20:
FIG. 20 is a screen capture of a Capital Asset Prioritization Tool (CAPT) user interface. This screen capture is an evaluation of the prediction from the Machine Learning analyses of the improvement in MTBF (from 140 to 192 days), if 34 of the most at risk Paper Insulated Lead Covered (PILC) sections were to be replace on a Feeder in Brooklyn at an estimated cost of $650,000. The Capital Asset Prioritization Tool is an example of a decision support application.

FIG. 18 contains the ROC Curve for the full ranked list.

Before the start of the project, it was not clear whether manhole events could be predicted at all from the very noisy secondary data. These results show that indeed manhole events are worthwhile to model for prediction.

Management Software

Interfaces were developed in order to make the results useful, and to assist in knowledge discovery.

CAP (Contingency Analysis Program)

CAP is a tool used at the main control center. It brings together information relevant to the outage of a primary feeder cable. When a contingency occurs, applications are in use (integrated into the CAP tool) that preemptively model the network for the possibility of additional feeders failing. A feeder susceptibility indicator (described above) is provided that gives the operators a new important piece of information: an indicator of which feeders are most likely to fail next. Operators can use this information to help determine the allocation of effort and resources towards preventing a cascade. The "worst consequences" feeder may not be the same as the "most likely to fail" feeder, so the operator may not always choose to allocate full resources to the feeder that is most likely to fail.

CAPT (Capital Asset Prioritization Tool)

CAPT is an application that offers an advanced mechanism for helping engineers and managers plan upgrades to the feeder systems of NYC. Using a graphic interface, users first enter constraints on work they would like to do. For instance, users can specify a borough or network, one or more specific feeder sections or type of feeder section, dollar amount to be allocated, etc. CAPT then produces graphs of benefit vs. cost curves of various replacement strategies with the objectives of optimizing "bang for the buck"—the greatest increase in system MTBF (Mean Time Between Failures) for the dollars spent.

Figure 21:
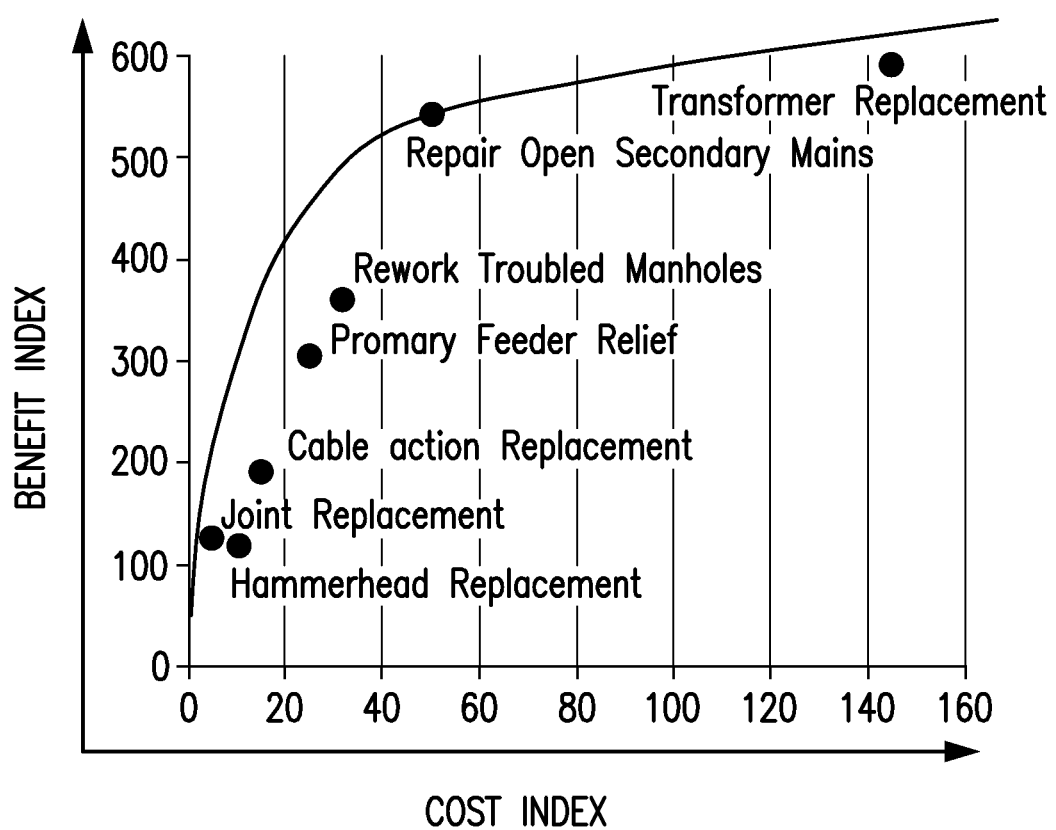
FIG. 21 depicts output from an example of Cost Benefit analysis of possible replacement strategies for specific at-risk components analyzed by the Machine Learning system. The solid line approximates the "Efficient Frontier" in portfolio management theory. Typical maintenance plans either attempt to better balance feeder loading in the system, or target replacement of at-risk sections, joints, transformers and secondary components. CAPT depends on the ODDS susceptibility model for targeting sections for maintenance work, and the MTBF estimation model for judging the relative value of different replacement strategies.

Key components of CAPT include 1) the SVM-regression model used to estimate MTBF for both feeders before any changes; 2) susceptibility models that order all cable sections, and joints from most at-risk to least at-risk, allowing CAPT to decide on good candidates for replacement; 3) The same model in 1) used to re-estimate the MTBF of a proposed improved feeder; and 3) a system that displays in chart form for the user, tradeoff (Pareto) curves of benefit vs. cost for various replacement strategies (FIG. 21). The model for feeders is the same as for CAP, but trained on the hottest period of the summer past for fall planning, and the model for cables, joints and hammerheads.

Manhole Event Structure Profiling Tool and Visualization Tool

Figure 22:
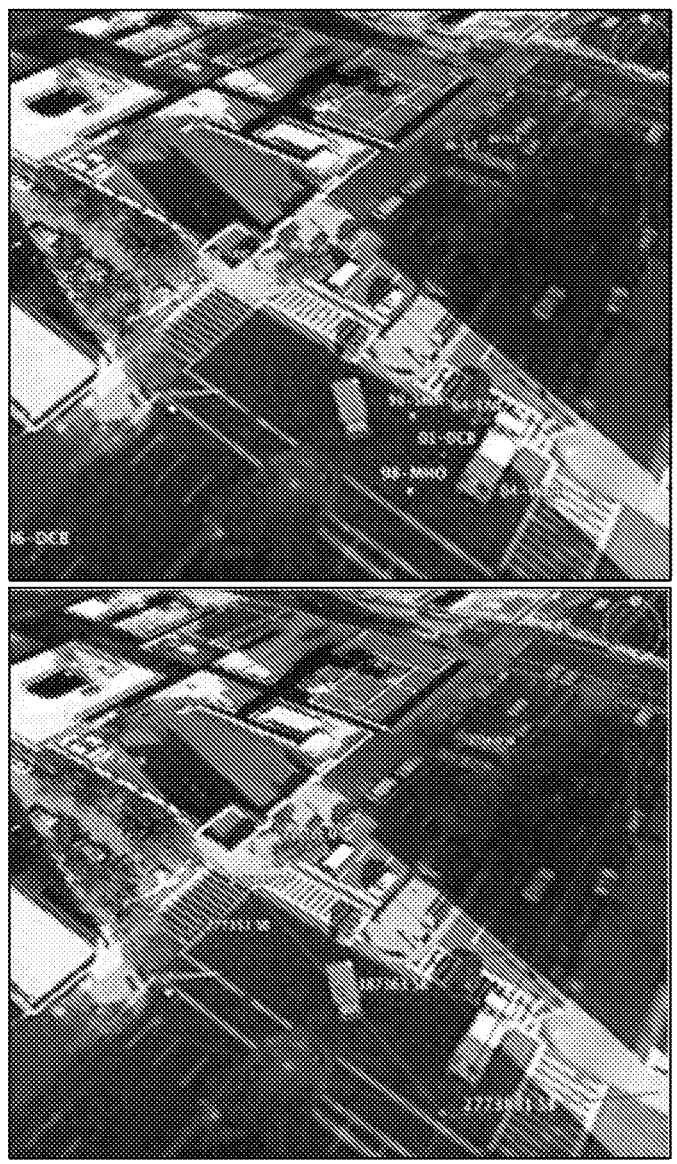
FIG. 22 depicts images from the Manhole Events Visualization Tool. Top: Geocoded ticket addresses, colored by trouble type. Yellow indicates a serious event type, purple indicates a potential precursor. If the user clicks on a ticket, the full ticket text is displayed. Bottom: Manholes and main cables within the same location. Note that a ticket within the intersection does not necessarily correspond to the nearest manhole.

Several tools were developed that allow a qualitative evaluation of results and methods by domain experts. The most useful tool was the "structure profiling tool," (also called the "report card" tool) that produces a full report of raw and processed data concerning a given individual manhole. Before this tool was implemented, an individual case study of a manhole took days and resulted in an incomplete study. A visualization tool was also developed that uses Google Earth as a backdrop to display the locations of events, manholes and cables. FIG. 22 displays two screen shots from the visualization tool.

Related Work

Applications include the prediction of power security breaches, forecasting, power system operation and control, and classification of power system disturbances. The predictive accuracy gained by using a different technique is often small compared to the accuracy gained through other steps in the discovery process, or by formulating the problem differently. The data in power engineering problems is generally assumed to be amenable to learning in its raw form, in contrast with our data. The second reason the present disclosure is distinct from the power engineering literature is that the machine learning techniques that have been developed by the power engineering community are often "black-box" methods such as neural networks and genetic algorithms. Neural networks and genetic algorithms can be viewed as heuristic non-convex optimization procedures for objectives that have multiple local minima; the algorithms' output can be extremely sensitive to the initial conditions. The presently disclosed methods and systems can employ convex optimization procedures to avoid this problem. Further, these types of algorithms do not generally produce interpretable/meaningful solutions (for instance the input-output relationship of a multilayer neural network is not generally interpretable), whereas embodiments of the present application can employ simple linear combinations of features.

The present disclosure addresses the challenges in mining historical power grid data of high complexity in an unprecedented fashion. The present disclosure contrasts entirely with a subset of work in power engineering where data is generated using Monte Carlo simulations, and simulated failures are predicted using machine learning algorithms. In a sense, the present disclosure can be closer to data mining challenges in other fields such as e-commerce, criminal investigation, or medical patient processing that encompass the full discovery process. For instance, it is interesting to contrast, the present disclosure on manhole events with the study of Cornélusse et al. who used domain experts to label "frequency incidents" at generators, and constructed a machine learning model from the frequency signals and labels that pinpoints failures. The manhole event prediction task discussed here also used domain experts to label trouble tickets as to whether they represent serious events; however, the level of processing required to clean and represent the tickets, along with the geocoding and information extraction required to pinpoint event locations, coupled with the integration of the ticket labeling machine learning task with the machine learning ranking task makes the latter task a much more substantial undertaking.

Lessons Learned

There are several "take-away" messages from the implementation of our tools on the NYC grid:

Prediction is Possible

Success has been shown in predicting failures of electrical components based on data collected by a major power utility company. It was not clear at the outset that knowledge discovery and data mining approaches would be able to predict electrical component failures, let alone assist domain engineers with proactive maintenance programs. Prior to the successes on the manhole event project, many utility engineers did not view manhole event prediction as a realistic goal. The trouble ticket data could easily have been left to become what Fayyad et al. consider a "data tomb." In this case, the remedy was created from a careful problem formulation, sophisticated text processing tools, and state-of-the-art machine learning techniques.

Data is the Key

Power companies already collect a great deal of data, however, if this data is going to be used for prediction of failures, it would ideally have certain properties: first, it should be clear from the data when a failure has occurred, and the type (and cause, if available) of failure. Second, the data should be as "clean" as possible, meaning for instance, that unique identifiers should be used for each component. Also, if a component is replaced, it is important to record the properties of the old component before the replacement; otherwise it cannot be determined what properties of components are common to those being replaced.

For trouble tickets, unstructured text fields should not be eliminated. It is true that structured data is easier to analyze; on the other hand, free-text can be much more reliable. This was also discussed by Dalal et al in dealing with trouble tickets from web transaction data; in their case, a 40 character free-text field contained more information than any other field in the database. In the case of trouble tickets discussed herein, the present representation based on the free-text can much more reliably determine the seriousness of events than the (structured) trouble type code. Further, the type of information that is generally recorded in trouble tickets cannot easily fit into a limited number of categories, and asking operators to choose the category under time pressure is not practical. It has been demonstrated that analysis of unstructured text is possible, and even practical.

Machine Learning Ranking Methods are Useful for Prioritization

Machine learning methods for ranking are not used in many application domains besides information retrieval. So far, it has been found that in the domain of electrical grid maintenance, a key to success is in the interpretation and processing of data, rather than in the exact machine learning method used; however, these new ranking methods are designed exactly for prioritization problems, and it is possible that these methods can offer an edge over older methods in many applications. Furthermore, as data collection becomes more automated, it is possible that the dependence on processing will lessen, and there will be a substantial advantage in using algorithms designed precisely for the task of prioritization.

Reactive Maintenance can Lead to Overtreatment

Figure 23:
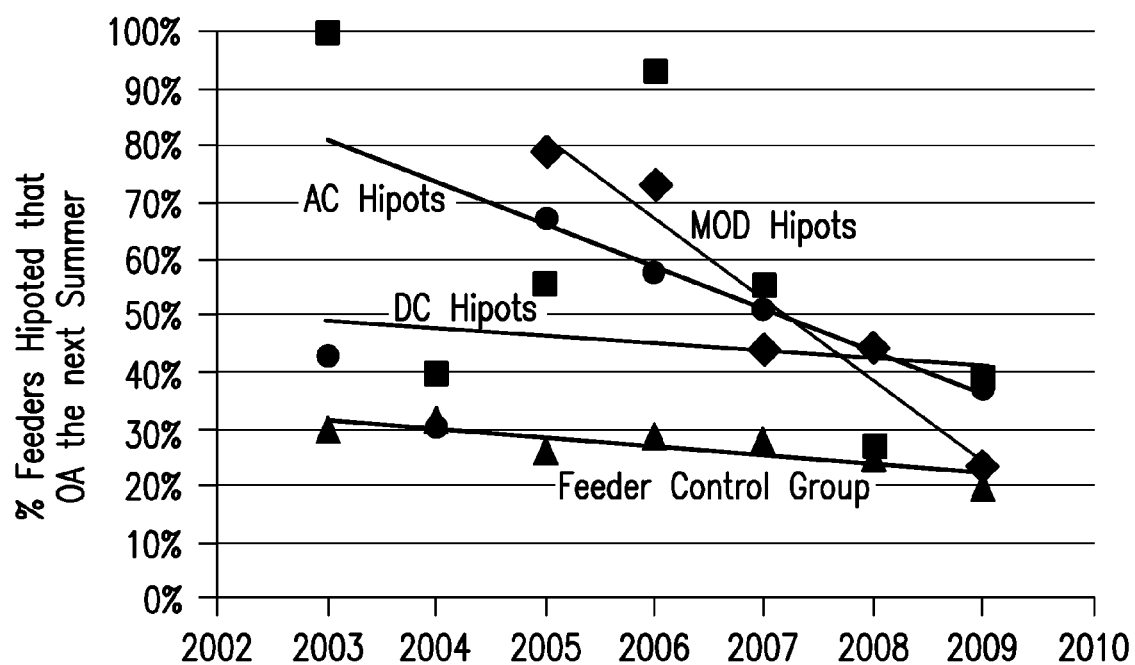
FIG. 23 demonstrates that overtreatment in the High Potential Preventive Maintenance program was identified using statistical comparisons to performance of Control Groups and remediation in the form of Modified and A/C Hipot tests was instigated by the utility.

It has been demonstrated with a statistical method called propensity that the High Potential (Hipot) testing program at Con Edison was overtreating the "patient," i.e., the feeders. Hipot is, by definition, preventive maintenance in that incipient faults are driven to failure by intentionally stressing the feeder. It was found however, that the DC hipot testing, in particular, was not outperforming a "placebo" control group which was scored by Con Edison to be equally "sick" but on which no work was done (FIG. 23). When a new AC test was added to undo some of the overtreatment, it was demonstrated that as the test was perfected on the Con Edison system, the performance level increased and would have subsequently surpassed that of the control group. Afterwards, operations and distribution engineering at Con Edison added a modified AC test that has since indeed improved on the performance of the control group. This interaction among machine learning, statistics, preventive maintenance programs and domain experts will likely identify overtreatment in most utilities that are predominantly reactive to failures now. That has been the experience in other industries, including those for which these techniques have been developed, such as automotive and aerospace, the military, as well as the medical industry.

CONCLUSIONS

Over the next several decades there will be increased dependence on an aging and overtaxed electrical infrastructure. The reliability of the future grid will depend heavily on the new pre-emptive maintenance policies that are currently being implemented around the world. The present disclosure provides a fundamental instrument for constructing effective policies: machine learning and knowledge discovery for prediction of vulnerable components. Power utilities can use the presently disclosed methods and systems for failure prediction and pre-emptive maintenance. Specialization of this process to feeder ranking, feeder component ranking (cables, joints, hammerheads, etc), MTBF estimation, and manhole vulnerability ranking has been shown. It has been demonstrated, through direct application to the NYC power grid, that data already collected by power companies can be harnessed to predict, and thus prevent, grid failures.

The invention claimed is:

1. A machine learning system for determining propensity to failure metrics of like components within an electrical grid comprising:
    (a) a raw data assembly to provide raw data representative of the like components within the electrical grid;
    (b) a data processor, operatively coupled to the raw data assembly, to convert the raw data to more uniform data via one or more data processing techniques;
    (c) a database, operatively coupled to the data processor, to store the more uniform data;
    (d) a machine learning engine, operatively coupled to the database, to provide:
        (i) a ranking of the collection of propensity to failure metrics for the like components, and
        (ii) absolute value of the propensity to failure metrics for the like components;
    (e) an evaluation engine, operatively coupled to the machine learning engine, to detect and remove non-complying metrics from the collection of propensity to failure metrics and to provide the collection of filtered propensity to failure metrics; and
    (f) a decision support application, operatively coupled to the evaluation engine, configured to display a ranking of the collection of filtered propensity to failure metrics of like components within the electrical grid.

2. The machine learning system of claim 1, wherein the raw data representative of the like components is obtained at least in part from a maintenance record or a maintenance request for at least one of the like components.

3. The machine learning system of claim 1, wherein the data processing techniques include one or more of an inferential join, pattern matching, information extraction, text normalization, querying overlapping data to find inconsistencies, and inference from related or duplicate records.

4. The machine learning system of claim 1, wherein the non-complying metrics are detected based on one or more of Area Under the Receive Operating Characteristic (ROC) Curve (AUC), weighted AUC, and a pre-defined percentage fail exclusion.

5. The machine learning system of claim 1, wherein the evaluation engine further comprises an outage derived database to store outage derived data sets that capture dynamic precursor to fail data representative of at least one of the like components.

6. The machine learning system of claim 5, wherein the dynamic precursor to fail data is obtained from a time-shifted time domain ending at just before the time of failure and beginning at a pre-selected time prior to the failure.

7. The machine learning system of claim 1, wherein the like components are secondary network components selected from cables, joints, terminators, hammerheads, manholes and transformers.

8. The machine learning system of claim 7, wherein the like components are manholes.

9. The machine learning system of claim 1, wherein the propensity to failure metric is selected from mean time between failure (MTBF) and mean time to failure (MTTF).

10. The machine learning system of claim 1, wherein the evaluation engine comprises a data historian to record a collection of filtered propensity to failure metrics over a first time period and a collection of filtered propensity to failure metrics over a second time period, and a data analyzer to determine whether the collection of filtered propensity to failure metrics at the first time period is statistically improved over the collection of filtered propensity to failure metric at the second time period.

11. A method for determining propensity to failure metrics of like components within an electrical grid via machine learning comprising:
    (a) providing a raw data assembly to provide raw data representative of the like components within the electrical grid;
    (b) processing the raw data to convert the raw data to more uniform data via one or more data processing techniques;
    (c) storing the more uniform data in a database;
    (d) transmitting the more uniform data to a machine learning engine to provide a collection of propensity to failure metrics for the like components;
    (e) evaluating the collection of propensity to failure metrics in an evaluation engine to detect and remove non-complying metrics from the collection of propensity to failure metrics and to provide the collection of filtered propensity to failure metrics;
    (f) ranking the collection of filtered propensity to failure metrics obtained from the evaluation engine and displaying the ranking on a decision support application; and
    (g) determining an absolute value of the propensity to failure metrics for the like components.

12. The method of claim 11, wherein the raw data representative of the like components is obtained at least in part from a maintenance record or a maintenance request for at least one of the like components.

13. The method of claim 11, wherein the data processing techniques include one or more of an inferential join, pattern matching, information extraction, text normalization, querying overlapping data to find inconsistencies, and inference from related or duplicate records.

14. The method of claim 11, wherein the non-complying metrics are detected based on one or more of Area Under the Receive Operating Characteristic (ROC) Curve (AUC), weighted AUC, and a pre-defined percentage fail exclusion.

15. The method of claim 11, wherein the evaluating further comprises storing outage derived data sets that capture dynamic precursor to fail data representative of at least one of the like components.

16. The method of claim 15, wherein the dynamic precursor to fail data is obtained from a time-shifted time domain ending at or just before the time of failure and beginning at a pre-selected time prior to the failure.

17. The method of claim 11, wherein the like components are components selected from feeders, cables, joints, terminators, hammerheads, manholes and transformers.

18. The machine learning system of claim 17, wherein the like components are manholes.

19. The method of claim 11, wherein the propensity to failure metric is selected from mean time between failure (MTBF) and mean time to failure (MTTF).

20. The method of claim 11, wherein the evaluating further comprises recording a collection of filtered propensity to failure metrics over a first time period and a collection of filtered propensity to failure metrics over a second time period, and analyzing to determine whether the collection of filtered propensity to failure metrics at the first time period is statistically improved over the collection of filtered propensity to failure metrics at the second time period.

21. The system of claim 1, wherein the absolute value of the propensity to failure metrics for the like components is determined using Cox proportional hazard model.

22. The system of claim 1, wherein absolute value of the propensity to failure metrics for the like components is determined by assessing interaction between one or more covariates that could affect one or more failure metrics for the like component.

* * * * *

UNITED STATES PATENT AND TRADEMARK OFFICE
CERTIFICATE OF CORRECTION

PATENT NO. : 8,751,421 B2  
APPLICATION NO. : 13/742124  
DATED : June 10, 2014  
INVENTOR(S) : Anderson et al.

It is certified that error appears in the above-identified patent and that said Letters Patent is hereby corrected as shown below:

On the title page

Item (72) the inventor's family name on the patent currently incorrectly reads: DOUGHERTY please delete: "Dougherty"

please replace it with: --Doherty--

Signed and Sealed this
Twenty-first Day of October, 2014

Michelle K. Lee
*Deputy Director of the United States Patent and Trademark Office*